United States Patent
Nakano et al.

(10) Patent No.: US 11,423,933 B2
(45) Date of Patent: Aug. 23, 2022

(54) MAGNETIC RECORDING MEDIUM HAVING CHARACTERIZED MAGNETIC LAYER AND MAGNETIC RECORDING AND REPRODUCING DEVICE

(71) Applicant: FUJIFILM Corporation, Tokyo (JP)

(72) Inventors: Megumi Nakano, Minami-ashigara (JP); Eiki Ozawa, Minami-ashigara (JP); Norihito Kasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 8 days.

(21) Appl. No.: 17/022,886

(22) Filed: Sep. 16, 2020

(65) Prior Publication Data
US 2021/0090599 A1 Mar. 25, 2021

(30) Foreign Application Priority Data
Sep. 19, 2019 (JP) .............................. JP2019-170512

(51) Int. Cl.
| | |
|---|---|
| G11B 5/706 | (2006.01) |
| G11B 5/73 | (2006.01) |
| G11B 5/733 | (2006.01) |
| G11B 5/008 | (2006.01) |
| G11B 5/735 | (2006.01) |
| G11B 5/71 | (2006.01) |

(52) U.S. Cl.
CPC ...... *G11B 5/70626* (2013.01); *G11B 5/00813* (2013.01); *G11B 5/71* (2013.01); *G11B 5/733* (2013.01); *G11B 5/7356* (2019.05); *G11B 5/73925* (2019.05)

(58) Field of Classification Search
None
See application file for complete search history.

(56) References Cited

U.S. PATENT DOCUMENTS

| | | | |
|---|---|---|---|
| 8,535,817 B2 * | 9/2013 | Imaoka ................... | G11B 5/70 428/844 |
| 9,711,174 B2 * | 7/2017 | Kasada ................. | G11B 5/733 |
| 9,721,605 B2 * | 8/2017 | Oyanagi .............. | G11B 5/8404 |
| 9,721,606 B2 * | 8/2017 | Kasada ................. | G11B 5/735 |
| 9,984,716 B1 * | 5/2018 | Kaneko ................... | G11B 5/70 |
| 10,134,433 B2 * | 11/2018 | Kasada ................. | G11B 5/78 |
| 10,347,280 B2 * | 7/2019 | Kasada ................. | G11B 5/71 |
| 10,373,639 B2 * | 8/2019 | Kasada ................. | G11B 5/584 |
| 10,410,666 B2 * | 9/2019 | Kasada ............. | G11B 5/70678 |
| 10,431,248 B2 * | 10/2019 | Kasada ................. | G11B 5/71 |
| 10,431,249 B2 * | 10/2019 | Kasada ............. | G11B 5/00813 |
| 10,438,628 B2 * | 10/2019 | Kasada ................. | G11B 5/706 |
| 10,477,072 B2 * | 11/2019 | Kasada ............. | G11B 5/8404 |
| 10,490,220 B2 * | 11/2019 | Kasada ............. | G11B 5/70615 |
| 10,497,388 B2 * | 12/2019 | Ozawa ................. | G11B 5/78 |
| 10,515,661 B2 * | 12/2019 | Kasada ............. | G11B 5/70615 |
| 10,522,180 B2 * | 12/2019 | Kasada ................. | G11B 5/71 |
| 10,706,875 B2 * | 7/2020 | Kasada ............. | G11B 5/00817 |
| 10,854,233 B2 * | 12/2020 | Ozawa ............. | G11B 5/70678 |
| 2012/0196156 A1 * | 8/2012 | Suzuki .................. | G11B 5/708 428/844 |
| 2016/0189739 A1 * | 6/2016 | Kasada ................. | G11B 5/842 428/840 |
| 2019/0027167 A1 * | 1/2019 | Tada ..................... | G11B 5/714 |
| 2019/0295581 A1 * | 9/2019 | Kasada ................. | G11B 5/712 |
| 2021/0241786 A1 * | 8/2021 | Kasada ............. | G11B 5/00813 |
| 2021/0358521 A1 * | 11/2021 | Kasada ................. | G11B 5/714 |

FOREIGN PATENT DOCUMENTS

JP 6378166 B2 8/2018

* cited by examiner

*Primary Examiner* — Kevin M Bernatz
(74) *Attorney, Agent, or Firm* — Sughrue Mion, PLLC

(57) ABSTRACT

The magnetic recording medium includes a non-magnetic support; and a magnetic layer including a ferromagnetic powder, in which one or more kinds of component selected from the group consisting of a fatty acid and a fatty acid amide are included in a portion of the magnetic layer side on the non-magnetic support, and a C—H derived C concentration calculated from a C—H peak surface area ratio in C1s spectra obtained by X-ray photoelectron spectroscopic analysis performed on a surface of the magnetic layer at a photoelectron take-off angle of 10 degrees, after pressing the magnetic layer at a pressure of 70 atm is 45 atom % or more.

14 Claims, 1 Drawing Sheet

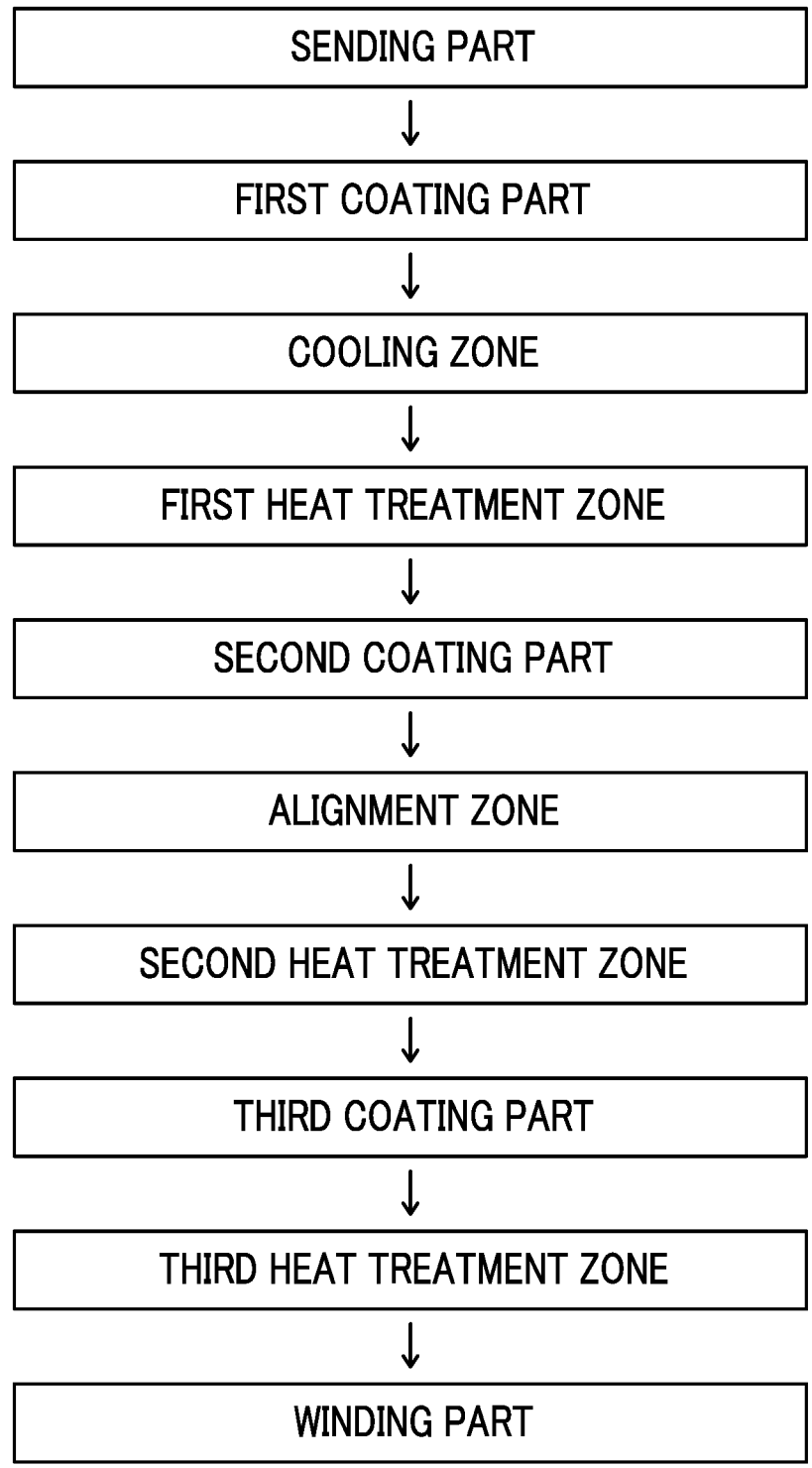

MAGNETIC RECORDING MEDIUM HAVING CHARACTERIZED MAGNETIC LAYER AND MAGNETIC RECORDING AND REPRODUCING DEVICE

CROSS-REFERENCE TO RELATED APPLICATIONS

This application claims priority under 35 U.S.C 119 to Japanese Patent Application No. 2019-170512 filed on Sep. 19, 2019. The above application is hereby expressly incorporated by reference, in its entirety, into the present application.

BACKGROUND OF THE INVENTION

1. Field of the Invention

The present invention relates to a magnetic recording medium and a magnetic recording and reproducing device.

2. Description of the Related Art

In recent years, magnetic recording media have been widely used as recording media for data storage for recording and storing various pieces of data (see, for example, JP6378166B).

SUMMARY OF THE INVENTION

Data recorded on a magnetic recording medium is generally reproduced by reading data recorded on a magnetic layer by sliding a magnetic head in contact with a surface of the magnetic layer while running the magnetic recording medium in a magnetic recording and reproducing device. However, in a case where the magnetic recording medium has deteriorated running stability, a reproducing output may decrease due to off-track. Thus, it is desirable that the magnetic recording medium has running stability.

Data recorded on various recording media such as a magnetic recording medium is called hot data, warm data, and cold data depending on access frequencies (reproducing frequencies). The access frequencies decrease in the order of hot data, warm data, and cold data, and the recording and storing of the data with low access frequency (for example, cold data) for a long period of time is referred to as "archive". The data amount recorded and stored on a recording medium for the archive increases in accordance with a dramatic increase in information contents and digitization of various information in recent years, and accordingly, a recording and reproducing system suitable for the archive is gaining attention.

A magnetic recording medium capable of exhibiting excellent running stability in a case of reproducing data after long-term storage as described above is suitable as a recording medium for archiving.

In view of the above, one aspect of the invention provides for a magnetic recording medium having excellent running stability after long-term storage.

According to one aspect of the invention, there is provided a magnetic recording medium comprising:

a non-magnetic support; and a magnetic layer including a ferromagnetic powder, in which one or more kinds of component selected from the group consisting of a fatty acid and a fatty acid amide are included in a portion of the magnetic layer side on the non-magnetic support, and a C—H derived C concentration calculated from a C—H peak surface area ratio in C1s spectra obtained by X-ray photoelectron spectroscopic analysis performed on a surface of the magnetic layer at a photoelectron take-off angle of 10 degrees, after pressing the magnetic layer at a pressure of 70 atm (hereinafter, also referred to as a "C—H derived C concentration after pressure" or "C—H derived C concentration") is 45 atom % or more.

1 atm=101,325 Pa (Pascal)=101,325 N (Newton)/m$^2$.

In an embodiment, the C—H derived C concentration after pressing may be 45 atom % to 80 atom %.

In an embodiment, the magnetic layer may include inorganic oxide-based particles.

In an embodiment the inorganic oxide-based particles may be composite particles of an inorganic oxide and a polymer.

In an embodiment, the magnetic recording medium may further include a non-magnetic layer including a non-magnetic powder between the non-magnetic support and the magnetic layer.

In an embodiment, the magnetic recording medium may include a back coating layer including a non-magnetic powder on a surface of the non-magnetic support opposite to the surface provided with the magnetic layer.

In an embodiment, the magnetic recording medium may be a magnetic tape.

One aspect of the invention relates to a magnetic recording and reproducing device including the magnetic recording medium and a magnetic head.

According to one aspect of the invention, it is possible to provide a magnetic recording medium having excellent running stability after long-term storage. In addition, according to one aspect of the invention, it is possible to provide a magnetic recording and reproducing device including the magnetic recording medium.

BRIEF DESCRIPTION OF THE DRAWINGS

FIG. 1 shows an example (step schematic view) of a manufacturing step of a magnetic recording medium.

DESCRIPTION OF THE PREFERRED EMBODIMENTS

Magnetic Recording Medium

One embodiment of the invention is a magnetic recording medium including a non-magnetic support; and a magnetic layer including a ferromagnetic powder, in which one or more kinds of component selected from the group consisting of a fatty acid and a fatty acid amide are included in a portion of the magnetic layer side on the non-magnetic support, and a C—H derived C concentration calculated from a C—H peak surface area ratio in C1s spectra obtained by X-ray photoelectron spectroscopic analysis performed on a surface of the magnetic layer at a photoelectron take-off angle of 10 degrees, after pressing the magnetic layer at a pressure of 70 atm (C—H derived C concentration after pressure) is 45 atom % or more.

The pressure of 70 atm for pressing the magnetic layer is a surface pressure applied to a surface of the magnetic layer by pressing. By causing the magnetic recording medium to pass between two rolls while causing the magnetic recording medium to run at a speed of 20 m/min, the surface pressure of 70 atm is applied to the surface of the magnetic layer. A tension of 0.5 N/m is applied to the running magnetic recording medium in a running direction. For example, for a tape-shaped magnetic recording medium (that is, a magnetic tape), a tension of 0.5 N/m is applied in the longitudinal direction of the running magnetic tape. The pressing is performed by causing the magnetic recording medium to pass between two rolls six times in total and applying the surface pressure of 70 atm at each time when passing each roll. A metal roll is used as the roll, and the roll is not heated. An environment for performing the pressing is an environment in which an atmosphere temperature is 20° C. to 25° C. and relative humidity is 40% to 60%. The magnetic recording medium to which the pressing is performed, is a magnetic recording medium which is not subjected to the long-term storage for 10 years or longer in a room temperature environment of relative humidity of 40% to 60%, and the storage corresponding to such long-term storage or an acceleration test corresponding to such long-term storage. The same applies to various physical properties relating to the magnetic recording medium described in the invention and the specification, unless otherwise noted.

The pressing described above can be performed by using a calender treatment device used for manufacturing a magnetic recording medium. For example, a magnetic tape accommodated in a magnetic tape cartridge is taken out and caused to pass through calender rolls in the calender treatment device, and accordingly, the magnetic tape can be pressed at a pressure of 70 atm.

The inventors of the invention have conducted intensive studies to provide a magnetic recording medium having excellent running stability after long-term storage, and found that it is suitable to press the magnetic layer at a pressure of 70 atm in an acceleration test corresponding to an example of archiving. This point will be further described below.

For example, the magnetic tape is generally accommodated in a magnetic tape cartridge in a state of being wound around a reel. Accordingly, the long-term storage of the magnetic tape after the data with a low access frequency is recorded, is also performed in a state of being accommodated in the magnetic tape cartridge. In the magnetic tape wound around a reel, a surface of a magnetic layer and a surface of a back coating layer (in a case of including a back coating layer) or a surface of the non-magnetic support on a side opposite to a surface of the magnetic layer (in a case of not including a back coating layer) come into contact with each other, and accordingly, the magnetic layer is pressed in the magnetic tape cartridge. As a result of various simulation performed by the inventors, it is determined that it is suitable to press the magnetic layer at a pressure of 70 atm in the acceleration test corresponding to long-term storage (example of archive) for approximately 10 years in an environment of the room temperature and relative humidity of 40% to 60%. In the invention and the present specification, the room temperature means a temperature in the range of 20° C. to 25° C. Therefore, the inventors conducted a running stability test after pressing the magnetic layer at 70 atm, and after intensive studies based on the results of this test, it is determined that the magnetic recording medium having a C—H derived C concentration after pressing of 45 atom % or more has excellent running stability after pressing the magnetic layer at 70 atm, that is, running stability in a state corresponding to the above long-term storage. This point is a new finding that has not been previously known and is not disclosed in JP6378166B.

A method for measuring the C—H derived C concentration after pressing will be described below. In the invention and the specification, the "surface of the magnetic layer" is identical to the surface of the magnetic recording medium on the magnetic layer side.

The "X-ray photoelectron spectroscopic analysis" is an analysis method which is normally called Electron Spectroscopy for Chemical Analysis (ESCA) or X-ray Photoelectron Spectroscopy (XPS). Hereinafter, the X-ray photoelectron spectroscopic analysis is also referred to as ESCA. The ESCA is an analysis method using a phenomenon of photoelectron emission in a case where a surface of a measurement target sample is irradiated with X-ray, and is widely used as an analysis method regarding a surface layer portion of a measurement target sample. According to the ESCA, it is possible to perform qualitative analysis and quantitative analysis by using X-ray photoemission spectra acquired by the analysis regarding the sample surface of the measurement target. A depth from the sample surface to the analysis position (hereinafter, also referred to as a "detection depth") and photoelectron take-off angle generally satisfy the following expression: detection depth≈mean free path of electrons×3×sin $\theta$. In the expression, the detection depth is a depth where 95% of photoelectrons configuring X-ray photoemission spectra are generated, and $\theta$ is the photoelectron take-off angle. From the expression described above, it is found that, as the photoelectron take-off angle decreases, the analysis regarding a shallow part of the depth from the sample surface can be performed, and as the photoelectron take-off angle increases, the analysis regarding a deep part of the depth from the sample surface can be performed. In the analysis performed by the ESCA at a photoelectron take-off angle of 10 degrees, an extreme outermost surface layer portion having a depth of approximately several nm from the sample surface generally becomes an analysis position. Accordingly, in the surface of the magnetic layer of the magnetic recording medium, according to the analysis performed by the ESCA at a photoelectron take-off angle of 10 degrees, it is possible to perform composition analysis regarding the extreme outermost surface layer portion having a depth of approximately several nm from the surface of the magnetic layer.

The C—H derived C concentration is a proportion of carbon atoms C configuring the C—H bond occupying total (based on atom) 100 atom % of all elements detected by the qualitative analysis performed by the ESCA. A region for the analysis is a region having an area of 300 μm×700 μm at a random position of the surface of the magnetic layer of the magnetic recording medium. The qualitative analysis is performed by wide scan measurement (pass energy: 160 eV, scan range: 0 to 1,200 eV, energy resolution: 1 eV/step) performed by ESCA. Then, spectra of entirety of elements detected by the qualitative analysis are obtained by narrow scan measurement (pass energy: 80 eV, energy resolution: 0.1 eV, scan range: set for each element so that the entirety of spectra to be measured is included). An atomic concentration (unit: atom %) of each element is calculated from the peak surface area of each spectrum obtained as described above. Here, an atomic concentration (C concentration) of carbon atoms is also calculated from the peak surface area in C1s spectra.

In addition, C1s spectra are obtained (pass energy: 10 eV, scan range: 276 to 296 eV, energy resolution: 0.1 eV/step). The obtained C1s spectra are subjected to a fitting process by a nonlinear least-squares method using a Gauss-Lorentz complex function (Gaussian component: 70%, Lorentz component: 30%), peak resolution of a peak of a C—H bond of the C1s spectra is performed, and a percentage (peak surface area ratio) of the separated C—H peak occupying the C1s spectra is calculated. A C—H derived C concentration is calculated by multiplying the calculated C—H peak surface area ratio by the C concentration.

An arithmetical mean of values obtained by performing the above-mentioned process at different positions of the surface of the magnetic layer of the magnetic recording medium after pressing three times is set as the C—H derived C concentration after pressing. In addition, the specific embodiment of the process described above is shown in examples which will be described later.

The magnetic recording medium includes one or more components selected from the group consisting of a fatty acid and a fatty acid amide in a portion on the magnetic layer side on the non-magnetic support. In the invention and the specification, the "portion of the magnetic layer side on the non-magnetic support" is a magnetic layer regarding the magnetic recording medium including the magnetic layer directly on the non-magnetic support, and is a magnetic layer and/or a non-magnetic layer regarding the magnetic recording medium including the non-magnetic layer which will be described later in detail between the non-magnetic support and the magnetic layer. Hereinafter, the "portion of the magnetic layer side on the non-magnetic support" is also simply referred to as a "portion of the magnetic layer side".

The fatty acid and the fatty acid amide included in the portion of the magnetic layer side of the magnetic recording medium are components which can respectively function as a lubricant in the magnetic recording medium. It is thought that, the C—H derived C concentration obtained by the analysis performed on the surface of the magnetic layer of the magnetic recording medium including one or more of these components in the portion of the magnetic layer side on the non-magnetic support, by the ESCA at a photoelectron take-off angle of 10 degrees is an index for the presence amount of the components (one or more components selected from the group consisting of a fatty acid and a fatty acid amide) in the extreme outermost surface layer portion of the magnetic layer. Specific description is as follows.

In X-ray photoemission spectra (horizontal axis: bonding energy, vertical axis: strength) obtained by the analysis performed by the ESCA, the C1s spectra include information regarding an energy peak of a 1 s orbit of the carbon atoms C. In such C1s spectra, a peak positioned at the vicinity of the bonding energy 284.6 eV is a C—H peak. This C—H peak is a peak derived from the bonding energy of the C—H bond of the organic compound. It is surmised that, in the extreme outermost surface layer portion of the magnetic layer of the magnetic recording medium including one or more components selected from the group consisting of a fatty acid and a fatty acid amide in the portion of the magnetic layer side on the non-magnetic support (that is, magnetic recording medium in which one or more components selected from the group consisting of a fatty acid and a fatty acid amide are detected from the portion of the magnetic layer side on the non-magnetic support), main constituent components of the C—H peak are components selected from the group consisting of a fatty acid and a fatty acid amide. Accordingly, it is thought that the C—H derived C concentration can be an index for the presence amount of the components as described above.

It is thought that a state where the C—H derived C concentration is equal to or greater than 45 atom % after pressing, that is, a state where a large amount of one or more components selected from the group consisting of a fatty acid and a fatty acid amide is present in the extreme outermost surface layer portion of the magnetic layer after pressing contributes to the promoting of the smooth sliding (improvement of sliding properties) between the magnetic head and the surface of the magnetic layer in a case of reproducing data recorded on the magnetic recording medium after long-term storage. It is thought that it is possible to increase running stability after long-term storage by improving the sliding properties.

However, the above description is merely a surmise and the invention is not limited to such a surmise. In addition, the invention is not limited to other surmises described in this specification, either.

Hereinafter, the magnetic recording medium will be further described in detail.

C—H Derived C Concentration after Pressing

The C—H derived C concentration after pressing of the magnetic recording medium is equal to or greater than 45 atom %, and is preferably equal to or greater than 48 atom % and more preferably equal to or greater than 50 atom %, from a viewpoint of further improving the running stability after long-term storage. According to the studies of the inventors, from a viewpoint of formability of a magnetic layer having high surface smoothness, the C—H derived C concentration is preferably, for example, equal to or smaller than 95 atom %, equal to or smaller than 90 atom %, equal to or smaller than 85 atom %, equal to or smaller than 80 atom %, equal to or smaller than 75 atom %, or equal to or smaller than 70 atom %.

The C—H derived C concentration after pressing described above can be controlled by, for example, the type of the non-magnetic filler used in the magnetic layer and the manufacturing step of the magnetic recording medium. This will be described later in detail.

Fatty Acid and Fatty Acid Amide

The magnetic recording medium includes one or more components selected from the group consisting of a fatty acid and a fatty acid amide in the portion of the magnetic layer side on the non-magnetic support. The portion on the magnetic layer side may include only one or both of a fatty acid and a fatty acid amide.

Examples of fatty acid include lauric acid, myristic acid, palmitic acid, stearic acid, oleic acid, linoleic acid, linolenic acid, behenic acid, erucic acid, and elaidic acid, stearic acid, myristic acid, and palmitic acid are preferable, and stearic acid is more preferable. Fatty acid may be included in the magnetic layer in a state of salt such as metal salt.

As fatty acid amide, amide of various fatty acid described above is used, and specific examples thereof include lauric acid amide, myristic acid amide, palmitic acid amide, and stearic acid amide.

Regarding fatty acid and a derivative of fatty acid (amide and ester which will be described later), a part derived from fatty acid of the fatty acid derivative preferably has a structure which is the same as or similar to that of fatty acid used in combination. As an example, in a case of using stearic acid as fatty acid, it is preferable to use stearic acid amide and/or stearic acid ester in combination.

In one embodiment, the magnetic recording medium including one or more components selected from the group consisting of a fatty acid and a fatty acid amide in the portion on the magnetic layer side can be manufactured by forming the magnetic layer using a magnetic layer forming composition including one or more components selected from the group consisting of a fatty acid and a fatty acid amide. In an embodiment, the magnetic recording medium including one or more components selected from the group consisting of a fatty acid and a fatty acid amide in the portion on the magnetic layer side can be manufactured by forming a non-magnetic layer using a non-magnetic layer forming composition including one or more components selected from the group consisting of a fatty acid and a fatty acid amide. In an embodiment, the magnetic recording medium including one or more components selected from the group consisting of a fatty acid and a fatty acid amide in the portion on the magnetic layer side can be manufactured by forming a non-magnetic layer using a non-magnetic layer forming composition including one or more components selected from the group consisting of a fatty acid and a fatty acid amide and forming a magnetic layer using a magnetic layer forming composition including one or more components selected from the group consisting of a fatty acid and a fatty acid amide. The non-magnetic layer can have a function of holding a lubricant such as a fatty acid or a fatty acid amide and supplying the lubricant to the magnetic layer. The lubricant such as a fatty acid or a fatty acid amide included in the non-magnetic layer can transition to the magnetic layer and can be present in the magnetic layer.

Regarding a content of fatty acid in the magnetic layer (or the magnetic layer forming composition; the same applies hereinafter) is, for example, 0.1 to 10.0 parts by mass and is preferably 1.0 to 7.0 parts by mass, with respect to 100.0 parts by mass of the ferromagnetic powder. In a case where two or more different fatty acids are added to the magnetic layer forming composition, the content thereof is a total content of the two or more different fatty acids. This point applies to contents of other components, in the same manner. In addition, in the invention and the specification, a given component may be used alone or used in combination of two or more kinds thereof, unless otherwise noted.

A content of fatty acid amide in the magnetic layer is, for example, 0.1 to 3.0 parts by mass and is preferably 0.1 to 1.0 part by mass with respect to 100.0 parts by mass of ferromagnetic powder.

Meanwhile, the content of fatty acid in the non-magnetic layer (or non-magnetic layer forming composition; the same applies hereinafter) is, for example, 1.0 to 10.0 parts by mass and is preferably 1.0 to 7.0 parts by mass with respect to 100.0 parts by mass of non-magnetic powder. In addition, the content of fatty acid amide in the non-magnetic layer is, for example, 0.1 to 3.0 parts by mass and is preferably 0.1 to 1.0 parts by mass with respect to 100.0 parts by mass of non-magnetic powder.

Next, the magnetic layer and the like included in the magnetic recording medium will be described more specifically.

Magnetic Layer

Ferromagnetic Powder

As the ferromagnetic powder included in the magnetic layer, a well-known ferromagnetic powder used as one kind or in combination of two or more kinds can be used as the ferromagnetic powder used in the magnetic layer of various magnetic recording media. It is preferable to use ferromagnetic powder having a small average particle size, from a viewpoint of improvement of recording density. From this viewpoint, an average particle size of the ferromagnetic powder is preferably 50 nm or less, more preferably 45 nm or less, even more preferably 40 nm or less, further more preferably 35 nm or less, and still preferably 30 nm or less, still more preferably 25 nm or less, and still even more preferably 20 nm or less. On the other hand, from a viewpoint of magnetization stability, the average particle size of the ferromagnetic powder is preferably 5 nm or more, more preferably 8 nm or more, even more preferably 10 nm or more, still preferably 15 nm or more, and still more preferably 20 nm.

Hexagonal Ferrite Powder

As a preferred specific example of the ferromagnetic powder, hexagonal ferrite powder can be used. For details of the hexagonal ferrite powder, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to, for example.

In the invention and the specification, the "hexagonal ferrite powder" is a ferromagnetic powder in which a hexagonal ferrite type crystal structure is detected as a main phase by X-ray diffraction analysis. The main phase is a structure to which a diffraction peak at the highest intensity in an X-ray diffraction spectrum obtained by the X-ray diffraction analysis belongs. For example, in a case where the diffraction peak at the highest intensity in the X-ray diffraction spectrum obtained by the X-ray diffraction analysis belongs to a hexagonal ferrite type crystal structure, it is determined that the hexagonal ferrite type crystal structure is detected as a main phase. In a case where only a single structure is detected by the X-ray diffraction analysis, this detected structure is set as a main phase. The hexagonal ferrite type crystal structure includes at least an iron atom, a divalent metal atom, and an oxygen atom as constituting atoms. A divalent metal atom is a metal atom which can be divalent cations as ions, and examples thereof include an alkali earth metal atom such as a strontium atom, a barium atom, or a calcium atom, and a lead atom. In the invention and the specification, the hexagonal strontium ferrite powder is powder in which a main divalent metal atom included in this powder is a strontium atom, and the hexagonal barium ferrite powder is a powder in which a main divalent metal atom included in this powder is a barium atom. The main divalent metal atom is a divalent metal atom occupying the greatest content in the divalent metal atom included in the powder based on atom %. However, the divalent metal atom described above does not include rare earth atom. The "rare earth atom" of the invention and the specification is selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), an europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder which is one embodiment of the hexagonal ferrite powder will be described more specifically.

An activation volume of the hexagonal strontium ferrite powder is preferably 800 to 1600 $nm^3$. The atomized hexagonal strontium ferrite powder showing the activation volume in the range described above is suitable for manufacturing a magnetic recording medium exhibiting excellent electromagnetic conversion characteristics. The activation volume of the hexagonal strontium ferrite powder is preferably equal to or greater than 800 $nm^3$, and can also be, for example, equal to or greater than 850 $nm^3$. In addition, from a viewpoint of further improving the electromagnetic conversion characteristics, the activation volume of the hexagonal strontium ferrite powder is more preferably equal to or smaller than 1500 $nm^3$, even more preferably equal to or smaller than 1400 $nm^3$, still preferably equal to or smaller than 1300 $nm^3$, still more preferably equal to or smaller than 1200 $nm^3$, and still even more preferably equal to or smaller than 1100 $nm^3$. The same applies to the activation volume of the hexagonal barium ferrite powder.

The "activation volume" is a unit of magnetization reversal and an index showing a magnetic magnitude of the particles. Regarding the activation volume and an anisotropy constant Ku which will be described later disclosed in the invention and the specification, magnetic field sweep rates of a coercivity Hc measurement part at time points of 3 minutes and 30 minutes are measured by using an oscillation sample type magnetic-flux meter (measurement temperature: 23° C.±1° C.), and the activation volume and the anisotropy constant Ku are values acquired from the following relational expression of Hc and an activation volume V. A unit of the anisotropy constant Ku is 1 erg/cc=1.0×10$^{-1}$ J/m$^3$.

$$Hc=2Ku/Ms\{1-[(kT/KuV)\ln(At/0.693)]^{1/2}\}$$

[In the expression, Ku: anisotropy constant (unit: J/m$^3$), Ms: saturation magnetization (unit: kA/m), k: Boltzmann's constant, T: absolute temperature (unit: K), V: activation volume (unit: cm$^3$), A: spin precession frequency (unit: s$^{-1}$), and t: magnetic field reversal time (unit: s)]

The anisotropy constant Ku can be used as an index of reduction of thermal fluctuation, that is, improvement of thermal stability. The hexagonal strontium ferrite powder can preferably have Ku equal to or greater than 1.8×105 J/m$^3$, and more preferably have Ku equal to or greater than 2.0×105 J/m$^3$. In addition, Ku of the hexagonal strontium ferrite powder can be, for example, equal to or smaller than 2.5×105 J/m$^3$. However, the high Ku is preferable, because it means high thermal stability, and thus, Ku is not limited to the exemplified value.

The hexagonal strontium ferrite powder may or may not include the rare earth atom. In a case where the hexagonal strontium ferrite powder includes the rare earth atom, a content (bulk content) of the rare earth atom is preferably 0.5 to 5.0 atom % with respect to 100 atom % of the iron atom. In one embodiment, the hexagonal strontium ferrite powder including the rare earth atom can have rare earth atom surface layer portion uneven distribution. The "rare earth atom surface layer portion uneven distribution" of the invention and the specification means that a content of rare earth atom with respect to 100 atom % of iron atom in a solution obtained by partially dissolving the hexagonal strontium ferrite powder with acid (hereinafter, referred to as a "rare earth atom surface layer portion content" or simply a "surface layer portion content" regarding the rare earth atom) and a content of rare earth atom with respect to 100 atom % of iron atom in a solution obtained by totally dissolving the hexagonal strontium ferrite powder with acid (hereinafter, referred to as a "rare earth atom bulk content" or simply a "bulk content" regarding the rare earth atom) satisfy a ratio of rare earth atom surface layer portion content/rare earth atom bulk content>1.0.

It means that the ratio of rare earth atom surface layer content/rare earth atom bulk content>1.0 is satisfied. The content of rare earth atom of the hexagonal strontium ferrite powder which will be described later is identical to the rare earth atom bulk content. With respect to this, the partial dissolving using acid is to dissolve the surface layer portion of particles configuring the hexagonal strontium ferrite powder, and accordingly, the content of rare earth atom in the solution obtained by the partial dissolving is the content of rare earth atom in the surface layer portion of the particles configuring the hexagonal strontium ferrite powder. The rare earth atom surface layer portion content satisfying a ratio of "rare earth atom surface layer portion content/rare earth atom bulk content>1.0" means that the rare earth atoms are unevenly distributed in the surface layer portion (that is, a larger amount of the rare earth atoms is present, compared to that inside), among the particles configuring the hexagonal strontium ferrite powder. The surface layer portion of the invention and the specification means a part of the region of the particles configuring the hexagonal strontium ferrite powder from the inside from the surface.

In a case where the hexagonal strontium ferrite powder includes the rare earth atom, a content (bulk content) of the rare earth atom is preferably 0.5 to 5.0 atom % with respect to 100 atom % of the iron atom. It is thought that the hexagonal strontium ferrite powder including the rare earth atom having the bulk content in the range described above and uneven distribution of the rare earth atom in the surface layer portion of the particles configuring the hexagonal strontium ferrite powder contribute to the prevention of reduction of reproduction output during the repeated reproduction. It is surmised that this is because the anisotropy constant Ku can be increased due to the hexagonal strontium ferrite powder including the rare earth atom having the bulk content in the range described above and uneven distribution of the rare earth atom in the surface layer portion of the particles configuring the hexagonal strontium ferrite powder. As the value of the anisotropy constant Ku is high, occurrence of a phenomenon, so-called thermal fluctuation can be prevented (that is, thermal stability can be improved). By preventing the occurrence of thermal fluctuation, it is possible to prevent reduction of the reproduction output during the repeated reproduction. It is surmised that, the uneven distribution of the rare earth atom in the particle surface layer portion of the hexagonal strontium ferrite powder contributes to stabilization of a spin at an iron (Fe) site in a crystal lattice of the surface layer portion, thereby increasing the anisotropy constant Ku.

It is surmised that the use of the hexagonal strontium ferrite powder having the rare earth atom surface layer portion uneven distribution as the ferromagnetic powder of the magnetic layer contributes to the prevention of chipping of the surface of the magnetic layer due to the sliding with the magnetic head. That is, it is surmised that the hexagonal strontium ferrite powder having the rare earth atom surface layer portion uneven distribution also contributes to the improvement of running durability of the magnetic recording medium. It is surmised that this is because the uneven distribution of the rare earth atom on the surface of the particles configuring the hexagonal strontium ferrite powder contributes to improvement of an interaction between the surface of the particles and an organic substance (for example, binding agent and/or additive) included in the magnetic layer, thereby improving hardness of the magnetic layer.

From a viewpoint of further preventing reduction of the reproduction output in the repeated reproduction and/or a viewpoint of further improving running durability, the content of rare earth atom (bulk content) is more preferably 0.5 to 4.5 atom %, even more preferably 1.0 to 4.5 atom %, and still preferably 1.5 to 4.5 atom %.

The bulk content is a content obtained by totally dissolving the hexagonal strontium ferrite powder. In the invention and the specification, the content of the atom is a bulk content obtained by totally dissolving the hexagonal strontium ferrite powder, unless otherwise noted. The hexagonal strontium ferrite powder including the rare earth atom may include only one kind of rare earth atom or may include two or more kinds of rare earth atom, as the rare earth atom. In a case where two or more kinds of rare earth atom are included, the bulk content is obtained from the total of the two or more kinds of rare earth atom. The same also applies to the other components of the invention and the specification. That is, for a given component, only one kind may be used or two or more kinds may be used, unless otherwise noted. In a case where two or more kinds are used, the content is a content of the total of the two or more kinds.

In a case where the hexagonal strontium ferrite powder includes the rare earth atom, the rare earth atom included therein may be any one or more kinds of the rare earth atom. Examples of the rare earth atom preferable from a viewpoint of further preventing reduction of the reproduction output during the repeated reproduction include a neodymium atom, a samarium atom, an yttrium atom, and a dysprosium atom, a neodymium atom, a samarium atom, an yttrium atom are more preferable, and a neodymium atom is even more preferable.

In the hexagonal strontium ferrite powder having the rare earth atom surface layer portion uneven distribution, a degree of uneven distribution of the rare earth atom is not limited, as long as the rare earth atom is unevenly distributed in the surface layer portion of the particles configuring the hexagonal strontium ferrite powder. For example, regarding the hexagonal strontium ferrite powder having the rare earth atom surface layer portion uneven distribution, a ratio of the surface layer portion content of the rare earth atom obtained by partial dissolving performed under the dissolving conditions which will be described later and the bulk content of the rare earth atom obtained by total dissolving performed under the dissolving conditions which will be described later, "surface layer portion content/bulk content" is greater than 1.0 and can be equal to or greater than 1.5. The "surface layer portion content/bulk content" greater than 1.0 means that the rare earth atom is unevenly distributed in the surface layer portion (that is, a larger amount of the rare earth atoms is present, compared to that inside), among the particles configuring the hexagonal strontium ferrite powder. In addition, the ratio of the surface layer portion content of the rare earth atom obtained by partial dissolving performed under the dissolving conditions which will be described later and the bulk content of the rare earth atom obtained by total dissolving performed under the dissolving conditions which will be described later, "surface layer portion content/bulk content" can be, for example, equal to or smaller than 10.0, equal to or smaller than 9.0, equal to or smaller than 8.0, equal to or smaller than 7.0, equal to or smaller than 6.0, equal to or smaller than 5.0, or equal to or smaller than 4.0. However, in the hexagonal strontium ferrite powder having the rare earth atom surface layer portion uneven distribution, the "surface layer portion content/bulk content" is not limited to the exemplified upper limit or the lower limit, as long as the rare earth atom is unevenly distributed in the surface layer portion of the particles configuring the hexagonal strontium ferrite powder.

The partial dissolving and the total dissolving of the hexagonal strontium ferrite powder will be described below. Regarding the hexagonal strontium ferrite powder present as the powder, sample powder for the partial dissolving and the total dissolving are collected from powder of the same lot. Meanwhile, regarding the hexagonal strontium ferrite powder included in a magnetic layer of a magnetic recording medium, a part of the hexagonal strontium ferrite powder extracted from the magnetic layer is subjected to the partial dissolving and the other part is subjected to the total dissolving. The extraction of the hexagonal strontium ferrite powder from the magnetic layer can be performed by a method disclosed in a paragraph 0032 of JP2015-091747A.

The partial dissolving means dissolving performed so that the hexagonal strontium ferrite powder remaining in the solution can be visually confirmed at the time of the completion of the dissolving. For example, by performing the partial dissolving, a region of the particles configuring the hexagonal strontium ferrite powder which is 10% to 20% by mass with respect to 100% by mass of a total of the particles can be dissolved. On the other hand, the total dissolving means dissolving performed until the hexagonal strontium ferrite powder remaining in the solution is not visually confirmed at the time of the completion of the dissolving.

The partial dissolving and the measurement of the surface layer portion content are, for example, performed by the following method. However, dissolving conditions such as the amount of sample powder and the like described below are merely examples, and dissolving conditions capable of performing the partial dissolving and the total dissolving can be randomly used.

A vessel (for example, beaker) containing 12 mg of sample powder and 10 ml of hydrochloric acid having a concentration of 1 mol/L is held on a hot plate at a set temperature of 70° C. for 1 hour. The obtained solution is filtered with a membrane filter having a hole diameter of 0.1 μm. The element analysis of the filtrate obtained as described above is performed by an inductively coupled plasma (ICP) analysis device. By doing so, the rare earth atom surface layer portion content with respect to 100 atom % of the iron atom can be obtained. In a case where a plurality of kinds of rare earth atoms are detected from the element analysis, a total content of the entirety of the rare earth atoms is the surface layer portion content. The same applies to the measurement of the bulk content.

Meanwhile, the total dissolving and the measurement of the bulk content are, for example, performed by the following method.

A vessel (for example, beaker) containing 12 mg of sample powder and 10 ml of hydrochloric acid having a concentration of 4 mol/L is held on a hot plate at a set temperature of 80° C. for 3 hours. After that, the process is performed in the same manner as in the partial dissolving and the measurement of the surface layer portion content, and the bulk content with respect to 100 atom % of the iron atom can be obtained.

From a viewpoint of increasing reproducing output in a case of reproducing data recorded on a magnetic recording medium, it is desirable that the mass magnetization σs of ferromagnetic powder included in the magnetic recording medium is high. In regards to this point, in hexagonal strontium ferrite powder which includes the rare earth atom but does not have the rare earth atom surface layer portion uneven distribution, σs tends to significantly decrease, compared to that in hexagonal strontium ferrite powder not including the rare earth atom. With respect to this, it is thought that the hexagonal strontium ferrite powder having the rare earth atom surface layer portion uneven distribution is preferable for preventing such a significant decrease in σs. In one embodiment, σs of the hexagonal strontium ferrite powder can be equal to or greater than 45 A·m$^2$/kg and can also be equal to or greater than 47 A·m$^2$/kg. On the other hand, from a viewpoint of noise reduction, σs is preferably equal to or smaller than 80 A·m$^2$/kg and more preferably equal to or smaller than 60 A·m$^2$/kg. σs can be measured by using a well-known measurement device capable of measuring magnetic properties such as an oscillation sample type magnetic-flux meter. In the invention and the specification, the mass magnetization σs is a value measured at a magnetic field strength of 15 kOe, unless otherwise noted. 1 [kOe]=($10^6$/4π) [A/m]

Regarding the content (bulk content) of the constituting atom in the hexagonal strontium ferrite powder, a content of the strontium atom can be, for example, 2.0 to 15.0 atom % with respect to 100 atom % of the iron atom. In one embodiment, in the hexagonal strontium ferrite powder, the divalent metal atom included in this powder can be only a strontium atom. In another embodiment, the hexagonal strontium ferrite powder can also include one or more kinds of other divalent metal atoms, in addition to the strontium atom. For example, a barium atom and/or a calcium atom can be included. In a case where the other divalent metal atom other than the strontium atom is included, a content of a barium atom and a content of a calcium atom in the hexagonal strontium ferrite powder respectively can be, for example, 0.05 to 5.0 atom % with respect to 100 atom % of the iron atom.

As the crystal structure of the hexagonal ferrite, a magnetoplumbite type (also referred to as an "M type"), a W type, a Y type, and a Z type are known. The hexagonal strontium ferrite powder may have any crystal structure. The crystal structure can be confirmed by X-ray diffraction analysis. In the hexagonal strontium ferrite powder, a single crystal structure or two or more kinds of crystal structure can be detected by the X-ray diffraction analysis. For example, in one embodiment, in the hexagonal strontium ferrite powder, only the M type crystal structure can be detected by the X-ray diffraction analysis. For example, the M type hexagonal ferrite is represented by a compositional formula of $AFe_{12}O_{19}$. Here, A represents a divalent metal atom, in a case where the hexagonal strontium ferrite powder has the M type, A is only a strontium atom (Sr), or in a case where a plurality of divalent metal atoms are included as A, the strontium atom (Sr) occupies the hexagonal strontium ferrite powder with the greatest content based on atom % as described above. A content of the divalent metal atom in the hexagonal strontium ferrite powder is generally determined according to the type of the crystal structure of the hexagonal ferrite and is not particularly limited. The same applies to a content of an iron atom and a content of an oxygen atom. The hexagonal strontium ferrite powder at least includes an iron atom, a strontium atom, and an oxygen atom, and can further include a rare earth atom. In addition, the hexagonal strontium ferrite powder may or may not include atoms other than these atoms. As an example the hexagonal strontium ferrite powder may include an aluminum atom (Al). A content of the aluminum atom can be, for example, 0.5 to 10.0 atom % with respect to 100 atom % of the iron atom. From a viewpoint of further preventing the reduction of the reproducing output during the repeated reproduction, the hexagonal strontium ferrite powder includes the iron atom, the strontium atom, the oxygen atom, and the rare earth atom, and a content of the atoms other than these atoms is preferably equal to or smaller than 10.0 atom %, more preferably 0 to 5.0 atom %, and may be 0 atom % with respect to 100 atom % of the iron atom. That is, in one embodiment, the hexagonal strontium ferrite powder may not include atoms other than the iron atom, the strontium atom, the oxygen atom, and the rare earth atom. The content shown with atom % described above is obtained by converting a value of the content (unit: % by mass) of each atom obtained by totally dissolving the hexagonal strontium ferrite powder into a value shown as atom % by using the atomic weight of each atom. In addition, in the invention and the specification, a given atom which is "not included" means that the content thereof obtained by performing total dissolving and measurement by using an ICP analysis device is 0% by mass. A detection limit of the ICP analysis device is generally equal to or smaller than 0.01 ppm (parts per million) based on mass. The expression "not included" is used as a meaning including that a given atom is included with the amount smaller than the detection limit of the ICP analysis device. In one embodiment, the hexagonal strontium ferrite powder does not include a bismuth atom (Bi).

Metal Powder

As a preferred specific example of the ferromagnetic powder, ferromagnetic metal powder can also be used. For details of the ferromagnetic metal powder, descriptions disclosed in paragraphs 0137 to 0141 of JP2011-216149A and paragraphs 0009 to 0023 of JP2005-251351A can be referred to, for example.

ε-Iron Oxide Powder

As a preferred specific example of the ferromagnetic powder, an ε-iron oxide powder can also be used. In the invention and the specification, the "ε-iron oxide powder" is a ferromagnetic powder in which an ε-iron oxide type crystal structure is detected as a main phase by X-ray diffraction analysis. For example, in a case where the diffraction peak at the highest intensity in the X-ray diffraction spectrum obtained by the X-ray diffraction analysis belongs to an ε-iron oxide type crystal structure, it is determined that the ε-iron oxide type crystal structure is detected as a main phase. As a producing method of the ε-iron oxide powder, a producing method from a goethite, and a reverse micelle method are known. All of the producing methods is well known. For example, for a method of producing the ε-iron oxide powder in which a part of Fe is substituted with a substitutional atom such as Ga, Co, Ti, Al, or Rh, a description disclosed in J. Jpn. Soc. Powder Metallurgy Vol. 61 Supplement, No. 51, pp. S280-S284, J. Mater. Chem. C, 2013, 1, pp. 5200-5206 can be referred to, for example. However, the producing method of the ε-iron oxide powder which can be used as the ferromagnetic powder in the magnetic layer of the magnetic recording medium is not limited to the method described here.

The activation volume of the ε-iron oxide powder is preferably in a range of 300 to 1500 $nm^3$. The atomized ε-iron oxide powder showing the activation volume in the range described above is suitable for manufacturing a magnetic recording medium exhibiting excellent electromagnetic conversion characteristics. The activation volume of the ε-iron oxide powder is preferably equal to or greater than 300 $nm^3$, and can also be, for example, equal to or greater than 500 $nm^3$. In addition, from a viewpoint of further improving the electromagnetic conversion characteristics, the activation volume of the ε-iron oxide powder is more preferably equal to or smaller than 1400 $nm^3$, even more preferably equal to or smaller than 1300 $nm^3$, still preferably equal to or smaller than 1200 $nm^3$, and still more preferably equal to or smaller than 1100 $nm^3$.

The anisotropy constant Ku can be used as an index of reduction of thermal fluctuation, that is, improvement of thermal stability. The ε-iron oxide powder can preferably have Ku equal to or greater than $3.0 \times 10^4$ $J/m^3$, and more preferably have Ku equal to or greater than $8.0 \times 10^4$ $J/m^3$. In addition, Ku of the ε-iron oxide powder can be, for example, equal to or smaller than $3.0 \times 10^5$ $J/m^3$. However, the high Ku is preferable, because it means high thermal stability, and thus, Ku is not limited to the exemplified value.

From a viewpoint of increasing reproducing output in a case of reproducing data recorded on a magnetic recording medium, it is desirable that the mass magnetization σs of ferromagnetic powder included in the magnetic recording medium is high. In regard to this point, in one embodiment, σs of the ε-iron oxide powder can be equal to or greater than 8 A·m²/kg and can also be equal to or greater than 12 A·m²/kg. On the other hand, from a viewpoint of noise reduction, σs of the ε-iron oxide powder is preferably equal to or smaller than 40 A·m²/kg and more preferably equal to or smaller than 35 A·m²/kg.

In the invention and the specification, average particle sizes of various powder such as the ferromagnetic powder and the like are values measured by the following method with a transmission electron microscope, unless otherwise noted.

The powder is imaged at an imaging magnification ratio of 100,000 with a transmission electron microscope, the image is printed on photographic printing paper so that the total magnification ratio of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of a plurality of particles is not limited to an embodiment in which particles configuring the aggregate directly come into contact with each other, but also includes an embodiment in which a binding agent, an additive, or the like which will be described later is interposed between the particles. A term, particles may be used for representing the powder.

As a method of collecting a sample powder from the magnetic recording medium in order to measure the particle size, a method disclosed in a paragraph 0015 of JP2011-048878A can be used, for example.

In the invention and the specification, unless otherwise noted,
(1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length,
(2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and
(3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter. In a case of the definition (3), the average particle size is an average diameter (also referred to as an average particle diameter).

The content (filling percentage) of the ferromagnetic powder of the magnetic layer is preferably 50% to 90% by mass and more preferably 60% to 90% by mass. A high filling percentage of the ferromagnetic powder in the magnetic layer is preferable from a viewpoint of improvement of recording density.

Binding Agent

The magnetic recording medium can be a coating type magnetic recording medium, and can include a binding agent in the magnetic layer. The binding agent is one or more kinds of resin. As the binding agent, various resins generally used as the binding agent of the coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. The resin may be a homopolymer or a copolymer. These resins can be used as the binding agent even in the non-magnetic layer and/or a back coating layer which will be described later.

For the binding agent described above, description disclosed in paragraphs 0028 to 0031 of JP2010-024113A can be referred to. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC) under the following measurement conditions. The weight-average molecular weight of the binding agent shown in examples which will be described later is a value obtained by performing polystyrene conversion of a value measured under the following measurement conditions. The amount of the binding agent used can be, for example, 1.0 to 30.0 parts by mass with respect to 100.0 parts by mass of the ferromagnetic powder.

GPC device: HLC-8120 (manufactured by Tosoh Corporation)
Column: TSK gel Multipore HXL-M (manufactured by Tosoh Corporation, 7.8 mmID (inner diameter)'30.0 cm)
Eluent: Tetrahydrofuran (THF)

In addition, a curing agent can also be used together with the resin which can be used as the binding agent. As the curing agent, in one embodiment, a thermosetting compound which is a compound in which a curing reaction (crosslinking reaction) proceeds due to heating can be used, and in another embodiment, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. This point is the same as regarding a layer formed by using a composition, in a case where the composition used for forming the other layer includes the curing agent. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of hardness of the magnetic layer.

The description regarding the binding agent and the curing agent described above can also be applied to the non-magnetic layer and/or the back coating layer. In this case, the description regarding the content can be applied by replacing the ferromagnetic powder with the non-magnetic powder.

Additives

The magnetic layer may include one or more kinds of additives, as necessary, together with the various components described above. As the additives, a commercially available product can be suitably selected and used according to the desired properties. Alternatively, a compound synthesized by a well-known method can be used as the additives. As the additives, the curing agent described above is used as an example. In addition, examples of the additive included in the magnetic layer include a non-magnetic filler, a lubricant, a dispersing agent, a dispersing assistant, an antibacterial agent, an antistatic agent, and an antioxidant. The non-magnetic filler is identical to the non-magnetic particles or non-magnetic powder. As the non-magnetic filler, a non-magnetic filler which can function as a projection formation agent and a non-magnetic filler which can function as an abrasive can be used. As the additive, a well-known additive such as various polymers disclosed in paragraphs 0030 to 0080 of JP2016-051493A can also be used.

Projection Formation Agent

As the projection formation agent which is one embodiment of the non-magnetic filler, particles of an inorganic substance can be used, particles of an organic substance can be used, and composite particles of the inorganic substance and the organic substance can also be used. Examples of the inorganic substance include inorganic oxide such as metal oxide, metal carbonate, metal sulfate, metal nitride, metal carbide, and metal sulfide, and inorganic oxide is preferable. In one embodiment, the projection formation agent can be inorganic oxide-based particles. Here, "-based" means "-containing". One embodiment of the inorganic oxide-based particles is particles consisting of inorganic oxide. Another embodiment of the inorganic oxide-based particles is composite particles of inorganic oxide and an organic substance, and as a specific example, composite particles of inorganic oxide and a polymer can be used. As such particles, for example, particles obtained by binding a polymer to a surface of the inorganic oxide particle can be used.

An average particle size of the projection formation agent is, for example, 30 to 300 nm and is preferably 40 to 200 nm. As the shape of the particles is a shape close to a sphere, indentation resistance exerted during a large pressure is applied is small, and accordingly, the particles are easily pushed into the magnetic layer. With respect to this, in a case where the shape of the particles is a shape other than the sphere, for example, a shape of a so-called deformed shape, a large indentation resistance is easily exerted, in a case where a large pressure is applied, and accordingly, particles are hardly pushed into the magnetic layer. In addition, regarding the particles having a low surface smoothness in which a surface of the particle is not even, the indentation resistance is easily exerted, in a case where a large pressure is applied, and accordingly, the particles are hardly pushed into the magnetic layer. It is thought that, in a case where the particles which are easily pushed into the magnetic layer are included in the magnetic layer, even in a case where the component selected from the group consisting of a fatty acid and a fatty acid amide is localized in the extreme outermost surface layer portion of the magnetic layer before pressing, the localized amount thereof may be reduced after the pressing, due to the particles pushed into the magnetic layer due to pressure. On the other hand, in a case where it is difficult for the particles of the projection formation agent to be pushed into the magnetic layer by pressing, it is surmised that the decrease in the localized amount after pressing can be suppressed. That is, it is surmised that the use of the projection formation agent hardly pushed into the magnetic layer by pressing contributes to controlling the C—H derived C concentration measured after pressing at a pressure of 70 atm to equal to or greater than 45 atom %.

Abrasive

The abrasive which is another embodiment of the non-magnetic filler is preferably a non-magnetic powder having Mohs hardness exceeding 8 and more preferably a non-magnetic powder having Mohs hardness equal to or greater than 9. With respect to this, the Mohs hardness of the projection formation agent can be, for example, equal to or smaller than 8 or equal to or smaller than 7. A maximum value of Mohs hardness is 10 of diamond. Specific examples thereof include powders of alumina ($Al_2O_3$), silicon carbide, boron carbide ($B_4C$), $SiO_2$, TiC, chromium oxide ($Cr_2O_3$), cerium oxide, zirconium oxide ($ZrO_2$), iron oxide, diamond, and the like, and among these, alumina powder such as α-alumina and silicon carbide powder are preferable. An average particle size of the abrasive is, for example, in a range of 30 to 300 nm and preferably in a range of 50 to 200 nm.

From a viewpoint of causing the projection formation agent and the abrasive to exhibit these functions in more excellent manner, a content of the projection formation agent in the magnetic layer is preferably 1.0 to 4.0 parts by mass and more preferably 1.2 to 3.5 parts by mass, with respect to 100.0 parts by mass of the ferromagnetic powder. Meanwhile, a content of the abrasive in the magnetic layer is preferably 1.0 to 20.0 parts by mass, more preferably 3.0 to 15.0 parts by mass, and even more preferably 4.0 to 10.0 parts by mass, with respect to 100.0 parts by mass of the ferromagnetic powder.

As an example of the additive which can be used in the magnetic layer including the abrasive, a dispersing agent disclosed in paragraphs 0012 to 0022 of JP2013-131285A can be used as a dispersing agent for improving dispersibility of the abrasive in the magnetic layer forming composition. In addition, for the dispersing agent, a description disclosed in paragraphs 0061 and 0071 of JP2012-133837A can be referred to. The dispersing agent may be included in the non-magnetic layer. For the dispersing agent which may be included in the non-magnetic layer, a description disclosed in a paragraph 0061 of JP2012-133837A can be referred to.

Fatty Acid Ester

One or both of the magnetic layer and the non-magnetic layer which will be described later in detail may or may not include fatty acid ester.

All of fatty acid ester, fatty acid, and fatty acid amide are components which can function as a lubricant. The lubricant is generally broadly divided into a fluid lubricant and a boundary lubricant. Fatty acid ester is called a component which can function as a fluid lubricant, whereas fatty acid and fatty acid amide are called as a component which can function as a boundary lubricant. It is considered that the boundary lubricant is a lubricant which can be adsorbed to a surface of powder (for example, ferromagnetic powder) and form a rigid lubricant film to decrease contact friction. Meanwhile, it is considered that the fluid lubricant is a lubricant which can form a liquid film on a surface of a magnetic layer to decrease friction due to the flowing of the liquid film. As described above, it is considered that the operation of fatty acid ester is different from the operation fatty acid and fatty acid amide as the lubricants. The inventors have surmised that the setting of the C—H derived C concentration which is considered as an index for the presence amount of one or more components selected from the group consisting of fatty acid and fatty acid amide in the extreme outermost surface layer portion of the magnetic layer to be equal to or greater than 45 atom % as a value after pressing contributes to improvement of running stability after long-term storage.

As fatty acid ester, esters of various fatty acids described above regarding fatty acid can be used. Specific examples thereof include butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

Regarding a content of fatty acid ester, a content of fatty acid ester in the magnetic layer is, for example, 0 to 10.0 parts by mass and is preferably 1.0 to 7.0 parts by mass with respect to 100.0 parts by mass of ferromagnetic powder.

In addition, the content of fatty acid ester in the non-magnetic layer is, for example, 0 to 10.0 parts by mass and is preferably 1.0 to 7.0 parts by mass with respect to 100.0 parts by mass of non-magnetic powder.

The magnetic layer described above can be provided on the surface of the non-magnetic support directly or indirectly through the non-magnetic layer.

Non-Magnetic Layer

Next, the non-magnetic layer will be described. The magnetic recording medium may include a magnetic layer directly on the non-magnetic support or may include a non-magnetic layer including the non-magnetic powder between the non-magnetic support and the magnetic layer. The non-magnetic powder used in the non-magnetic layer may be powder of an inorganic substance or powder of an organic substance. In addition, carbon black and the like can be used. Examples of the inorganic substance include metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0146 to 0150 of JP2011-216149A can be referred to. For carbon black capable of being used in the non-magnetic layer, a description disclosed in paragraphs 0040 and 0041 of JP2010-024113A can be referred to. The content (filling percentage) of the non-magnetic powder of the non-magnetic layer is preferably 50% to 90% by mass and more preferably 60% to 90% by mass.

The non-magnetic layer can include a binding agent and can also include additives. In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the invention and the specification also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 100 Oe, or a layer having a residual magnetic flux density equal to or smaller than 10 mT and coercivity equal to or smaller than 100 Oe. It is preferable that the non-magnetic layer does not have a residual magnetic flux density and coercivity.

Non-Magnetic Support

Next, the non-magnetic support will be described. As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heat treatment may be performed with respect to these supports in advance.

Back Coating Layer

The magnetic recording medium may or may not include a back coating layer including a non-magnetic powder on a surface of the non-magnetic support opposite to the surface provided with the magnetic layer. The back coating layer preferably includes any one or both of carbon black and inorganic powder. The back coating layer can include a binding agent and can also include additives. In regards to the binding agent included in the back coating layer and various additives, a well-known technology regarding the back coating layer can be applied, and a well-known technology regarding the list of the magnetic layer and/or the non-magnetic layer can also be applied. For example, for the back coating layer, descriptions disclosed in paragraphs 0018 to 0020 of JP2006-331625A and page 4, line 65, to page 5, line 38, of U.S. Pat. No. 7,029,774B can be referred to.

Various Thicknesses

A thickness of the non-magnetic support is preferably 3.0 to 6.0 μm.

A thickness of the magnetic layer is preferably equal to or smaller than 0.15 μm and more preferably equal to or smaller than 0.1 μm, from a viewpoint of realization of high-density recording required in recent years. The thickness of the magnetic layer is even more preferably 0.01 to 0.1 µm. The magnetic layer may be at least one layer, or the magnetic layer can be separated to two or more layers having magnetic properties, and a configuration regarding a well-known multilayered magnetic layer can be applied. A thickness of the magnetic layer which is separated into two or more layers is a total thickness of the layers.

A thickness of the non-magnetic layer is, for example, 0.1 to 1.5 µm and preferably 0.1 to 1.0 µm.

A thickness of the back coating layer is preferably equal to or smaller than 0.9 µm and even more preferably 0.1 to 0.7 µm.

The thicknesses of various layers and the non-magnetic support of the magnetic recording medium can be obtained by a well-known film thickness measurement method. As an example, a cross section of the magnetic recording medium in a thickness direction is exposed by a well-known method of ion beams or microtome, and the exposed cross section is observed with a scanning electron microscope. In the cross section observation, various thicknesses can be obtained as the thickness obtained at one portion, or as an arithmetical mean of thicknesses obtained at a plurality of portions which are two or more portions randomly extracted, for example, two portions. Alternatively, the thickness of each layer may be obtained as a designed thickness calculated under the manufacturing conditions.

Manufacturing Step

Preparation of Each Layer Forming Composition

A step of preparing the composition for forming the magnetic layer, the non-magnetic layer, or the back coating layer can generally include at least a kneading step, a dispersing step, and a mixing step provided before and after these steps, as necessary. Each step may be divided into two or more stages. Components used in the preparation of each layer forming composition may be added at the beginning or during any step. As the solvent, one kind or two or more kinds of various kinds of solvents usually used for producing a coating type magnetic recording medium can be used. For the solvent, descriptions disclosed in paragraph 0153 of JP2011-216149A can be referred to, for example. In addition, each component may be separately added in two or more steps. In order to manufacture the above magnetic recording medium, a well-known manufacturing technology of the related art can be used in various steps. In the kneading step, an open kneader, a continuous kneader, a pressure kneader, or a kneader having a strong kneading force such as an extruder is preferably used. For details of the kneading processes, descriptions disclosed in JP1989-106338A (JP-H01-106338A) and JP1989-079274A (JP-H01-079274A) can be referred to. As a disperser, a well-known disperser can be used. Each layer forming composition may be filtered by a well-known method before performing the coating step. The filtering can be performed by using a filter, for example. As the filter used in the filtering, a filter having a hole diameter of 0.01 to 3 µm (for example, filter made of glass fiber or filter made of polypropylene) can be used, for example.

In one embodiment, in the step of preparing the magnetic layer forming composition, a dispersion liquid including a projection formation agent (hereinafter, referred to as a "projection formation agent liquid") can be prepared, and then this projection formation agent liquid can be mixed with one or more other components of the magnetic layer forming composition. For example, the projection formation agent liquid, a dispersion liquid including an abrasive (hereinafter, referred to as an "abrasive solution"), and a dispersion liquid including a ferromagnetic powder (hereinafter, referred to as a "magnetic liquid") are separately prepared, mixed, and dispersed, thereby preparing the magnetic layer forming composition. It is preferable to separately prepare various dispersion liquids in order to improve the dispersibility of the ferromagnetic powder, the projection formation agent, and the abrasive in the magnetic layer forming composition. For example, the projection formation agent liquid can be prepared by a well-known dispersion process such as ultrasonic process. The ultrasonic treatment can be performed for about 1 to 300 minutes at an ultrasonic output of about 10 to 2,000 watts per 200 cc (1 cc=1 cm$^3$). In addition, the filtering may be performed after a dispersion process. For the filter used for the filtering, the above description can be referred to.

Coating Step, Cooling Step, Heating and Drying Step

The magnetic layer can be formed, for example, by directly applying the magnetic layer forming composition onto the non-magnetic support or performing multilayer coating of the magnetic layer forming composition with the non-magnetic layer forming composition in order or at the same time. For details of the coating for forming each layer, a description disclosed in a paragraph 0066 of JP2010-231843A can be referred to.

As described above, in an embodiment, the magnetic recording medium includes the non-magnetic layer between the non-magnetic support and the magnetic layer. Such a magnetic recording medium can be preferably manufactured by successive multilayer coating. A manufacturing step of performing the successive multilayer coating can be preferably performed as follows. The non-magnetic layer is formed through a coating step of applying a non-magnetic layer forming composition onto a non-magnetic support to form a coating layer, and a heating and drying step of drying the formed coating layer by a heat treatment. In addition, the magnetic layer is formed through a coating step of applying a magnetic layer forming composition onto the formed non-magnetic layer to form a coating layer, and a heating and drying step of drying the formed coating layer by a heat treatment.

In the non-magnetic layer forming step of the manufacturing method of performing such successive multilayer coating, it is preferable to perform a coating step by using the non-magnetic layer forming composition including one or more components selected from the group consisting of fatty acid and fatty acid amide and to perform a cooling step of cooling the coating layer between the coating step and the heating and drying step, in order to adjust the C—H derived C concentration to be equal to or greater than 45 atom % in the magnetic recording medium including one or more components selected from the group consisting of fatty acid and fatty acid amide in the portion of the magnetic layer side on the non-magnetic support. The reason thereof is not clear, but it is surmised that the reason thereof is because the components (fatty acid and/or fatty acid amide) are moved to the surface of the non-magnetic layer at the time of solvent volatilization of the heating and drying step, by cooling the coating layer of the non-magnetic layer forming composition before the heating and drying step. In addition, the use of the projection formation agent described above as the projection formation agent of the magnetic layer is preferable to prevent the localized amount of the above-mentioned components localized in the extreme outermost surface layer portion of the magnetic layer before pressing from decreasing after pressing.

In the embodiment, in the magnetic layer forming step, a coating step of applying a magnetic layer forming composition including one or more components selected from the group consisting of a fatty acid and a fatty acid amide onto a non-magnetic layer to form a coating layer, and a heating and drying step of drying the formed coating layer by a heat treatment can be performed.

Hereinafter, an example of the manufacturing step of the magnetic recording medium will be described with reference to FIG. 1. However, the invention is not limited to the following examples.

FIG. 1 is a step schematic view showing an example of a step of manufacturing the magnetic recording medium including a non-magnetic layer and a magnetic layer in this order on one surface of a non-magnetic support and including a back coating layer on the other surface thereof. In the example shown in FIG. 1, an operation of sending a non-magnetic support (elongated film) from a sending part and winding the non-magnetic support around a winding part is continuously performed, and various processes of coating, drying, and alignment are performed in each part or each zone shown in FIG. 1, and thus, it is possible to form a non-magnetic layer and a magnetic layer on one surface of the running non-magnetic support by sequential multilayer coating and to form a back coating layer on the other surface thereof. In the example shown in FIG. 1, the manufacturing step which is normally performed for manufacturing the coating type magnetic recording medium can be performed in the same manner except for including a cooling zone.

The non-magnetic layer forming composition is applied onto the non-magnetic support sent from the sending part in a first coating part (coating step of non-magnetic layer forming composition).

After the coating step, a coating layer of the non-magnetic layer forming composition formed in the coating step is cooled in a cooling zone (cooling step). For example, it is possible to perform the cooling step by allowing the non-magnetic support on which the coating layer is formed to pass through a cooling atmosphere. An atmosphere temperature of the cooling atmosphere is preferably −10° C. to 0° C. and more preferably −5° C. to 0° C. The time for performing the cooling step (for example, time while any part of the coating layer is delivered to and sent from the cooling zone (hereinafter, also referred to as a "retention time")) is not particularly limited. As the retention time increases, the C—H derived C concentration tends to be increased. Accordingly, the retention time is preferably adjusted by performing preliminary experiment as necessary, so that the C—H derived C concentration equal to or greater than 45 atom % is realized. In the cooling step, cooled air may blow to the surface of the coating layer.

After the cooling zone, in a first heat treatment zone, the coating layer is heated after the cooling step to dry the coating layer (heating and drying step). The heating and drying process can be performed by causing the non-magnetic support including the coating layer after the cooling step to pass through the heated atmosphere. An atmosphere temperature of the heated atmosphere here is, for example, approximately 60° C. to 140° C. However, the atmosphere temperature may be a temperature at which the solvent is volatilized and the coating layer is dried, and the atmosphere temperature is not limited to the atmosphere temperature in the range described above. In addition, the heated air may randomly blow to the surface of the coating layer. The points described above are also applied to a heating and drying step of a second heat treatment zone and a heating and drying step of a third heat treatment zone which will be described later, in the same manner.

Next, in a second coating part, the magnetic layer forming composition is applied onto the non-magnetic layer formed by performing the heating and drying step in the first heat treatment zone (coating step of magnetic layer forming composition).

After that, in the embodiment of performing the alignment process, while the coating layer of the magnetic layer forming composition is wet, an alignment process of the ferromagnetic powder in the coating layer is performed in an alignment zone. For the alignment process, various well-known technologies such as descriptions disclosed in a paragraph 0067 of JP2010-231843A can be used. For example, a homeotropic alignment process can be performed by a well-known method such as a method using a different polar opposing magnet. In the alignment zone, a drying speed of the coating layer can be controlled by a temperature, an air flow of the dry air and/or a transporting rate of the magnetic tape in the alignment zone. In addition, the coating layer may be preliminarily dried before transporting to the alignment zone.

The coating layer after the alignment process is subjected to the heating and drying step in the second heat treatment zone.

Next, in the third coating part, a back coating layer forming composition is applied to a surface of the non-magnetic support on a side opposite to the surface where the non-magnetic layer and the magnetic layer are formed, to form a coating layer (coating step of back coating layer forming composition). After that, the coating layer is heated and dried in the third heat treatment zone.

By the step described above, it is possible to obtain the magnetic recording medium including the non-magnetic layer and the magnetic layer in this order on one surface of the non-magnetic support and including the back coating layer on the other surface thereof.

In order to manufacture the magnetic recording medium, well-known various processes for manufacturing the coating type magnetic recording medium can be performed. For details of the various processes, descriptions disclosed in paragraphs 0067 to 0069 of JP2010-231843A can be referred to, for example.

By doing so, it is possible to obtain the magnetic recording medium. However, the manufacturing method described above is merely an example, the C—H derived C concentration after pressing can be controlled to be equal to or greater than 45 atom % after pressing by any unit for adjusting the C—H derived C concentration after pressing, and such an embodiment is also included in the invention.

A servo pattern can be formed on the magnetic recording medium manufactured as described above by a well-known method, in order to realize tracking control of a magnetic head of the magnetic recording and reproducing device and control of a running speed of the magnetic recording medium. The "formation of the servo pattern" can be "recording of a servo signal". In one embodiment, the magnetic recording medium can be a tape-shaped magnetic recording medium (magnetic tape), and in another embodiment, may be a disk-shaped magnetic recording medium (magnetic disc). Hereinafter, the formation of the servo pattern will be described using a magnetic tape as an example.

The servo pattern is generally formed along a longitudinal direction of the magnetic tape. As a method of control using a servo signal (servo control), timing-based servo (TBS), amplitude servo, or frequency servo is used.

As shown in European Computer Manufacturers Association (ECMA)-319, a timing-based servo system is used in a magnetic tape based on a linear-tape-open (LTO) standard (generally referred to as an "LTO tape"). In this timing-based servo system, the servo pattern is configured by continuously disposing a plurality of pairs of magnetic stripes (also referred to as "servo stripes") not parallel to each other in a longitudinal direction of the magnetic tape. As described above, a reason for that the servo pattern is configured with one pair of magnetic stripes not parallel to each other is because a servo signal reading element passing on the servo pattern recognizes a passage position thereof. Specifically, one pair of the magnetic stripes are formed so that a gap thereof is continuously changed along the width direction of the magnetic tape, and a relative position of the servo pattern and the servo signal reading element can be recognized, by the reading of the gap thereof by the servo signal reading element. The information of this relative position can realize the tracking of a data track. Accordingly, a plurality of servo tracks are generally set on the servo pattern along the width direction of the magnetic tape.

The servo band is configured of a servo signal continuous in the longitudinal direction of the magnetic tape. A plurality of servo bands are normally provided on the magnetic tape. For example, the number thereof is 5 in the LTO tape. A region interposed between two adjacent servo bands is called a data band. The data band is configured of a plurality of data tracks and each data track corresponds to each servo track.

In one embodiment, as shown in JP2004-318983A, information showing the number of servo band (also referred to as "servo band identification (ID)" or "Unique Data Band Identification Method (UDIM) information") is embedded in each servo band. This servo band ID is recorded by shifting a specific servo stripe among the plurality of pair of servo stripes in the servo band so that the position thereof is relatively deviated in the longitudinal direction of the magnetic tape. Specifically, the position of the shifted specific servo stripe among the plurality of pair of servo stripes is changed for each servo band. Accordingly, the recorded servo band ID becomes unique for each servo band, and therefore, the servo band can be uniquely specified by only reading one servo band by the servo signal reading element.

In a method of uniquely specifying the servo band, a staggered method as shown in ECMA-319 is used. In this staggered method, the group of one pair of magnetic stripes (servo stripe) not parallel to each other which are continuously disposed in the longitudinal direction of the magnetic tape is recorded so as to be shifted in the longitudinal direction of the magnetic tape for each servo band. A combination of this shifted servo band between the adjacent servo bands is set to be unique in the entire magnetic tape, and accordingly, the servo band can also be uniquely specified by reading of the servo pattern by two servo signal reading elements.

In addition, as shown in ECMA-319, information showing the position in the longitudinal direction of the magnetic tape (also referred to as "Longitudinal Position (LPOS) information") is normally embedded in each servo band. This LPOS information is recorded so that the position of one pair of servo stripes are shifted in the longitudinal direction of the magnetic tape, in the same manner as the UDIM information. However, unlike the UDIM information, the same signal is recorded on each servo band in this LPOS information.

Other information different from the UDIM information and the LPOS information can be embedded in the servo band. In this case, the embedded information may be different for each servo band as the UDIM information, or may be common in all of the servo bands, as the LPOS information.

In addition, as a method of embedding the information in the servo band, a method other than the method described above can be used. For example, a predetermined code may be recorded by thinning out a predetermined pair among the group of pairs of the servo stripes.

A servo pattern forming head is also referred to as a servo write head. The servo write head includes pairs of gaps corresponding to the pairs of magnetic stripes by the number of servo bands. In general, a core and a coil are respectively connected to each of the pairs of gaps, and a magnetic field generated in the core can generate leakage magnetic field in the pairs of gaps, by supplying a current pulse to the coil. In a case of forming the servo pattern, by inputting a current pulse while causing the magnetic tape to run on the servo write head, the magnetic pattern corresponding to the pair of gaps is transferred to the magnetic tape, and the servo pattern can be formed. A width of each gap can be suitably set in accordance with a density of the servo patterns to be formed. The width of each gap can be set as, for example, equal to or smaller than 1 µm, 1 to 10 µm, or equal to or greater than 10 µm.

Before forming the servo pattern on the magnetic tape, a demagnetization (erasing) process is generally performed on the magnetic tape. This erasing process can be performed by applying a uniform magnetic field to the magnetic tape by using a DC magnet and an AC magnet. The erasing process includes direct current (DC) erasing and alternating current (AC) erasing. The AC erasing is performed by slowing decreasing an intensity of the magnetic field, while reversing a direction of the magnetic field applied to the magnetic tape. Meanwhile, the DC erasing is performed by adding the magnetic field in one direction to the magnetic tape. The DC erasing further includes two methods. A first method is horizontal DC erasing of applying the magnetic field in one direction along a longitudinal direction of the magnetic tape. A second method is vertical DC erasing of applying the magnetic field in one direction along a thickness direction of the magnetic tape. The erasing process may be performed with respect to all of the magnetic tape or may be performed for each servo band of the magnetic tape.

A direction of the magnetic field to the servo pattern to be formed is determined in accordance with the direction of erasing. For example, in a case where the horizontal DC erasing is performed to the magnetic tape, the formation of the servo pattern is performed so that the direction of the magnetic field and the direction of erasing becomes opposite to each other. Accordingly, the output of the servo signal obtained by the reading of the servo pattern can be increased. As disclosed in JP2012-053940A, in a case where the magnetic pattern is transferred to the magnetic tape subjected to the vertical DC erasing by using the gap, the servo signal obtained by the reading of the formed servo pattern has a unipolar pulse shape. Meanwhile, in a case where the magnetic pattern is transferred to the magnetic tape subjected to the horizontal DC erasing by using the gap, the servo signal obtained by the reading of the formed servo pattern has a bipolar pulse shape.

The magnetic tape is normally accommodated in a magnetic tape cartridge and the magnetic tape cartridge is mounted on a magnetic recording and reproducing device.

In the magnetic tape cartridge, the magnetic tape is generally accommodated in a cartridge main body in a state of being wound around a reel. The reel is rotatably provided in the cartridge main body. As the magnetic tape cartridge, a single reel type magnetic tape cartridge including one reel in a cartridge main body and a twin reel type magnetic tape cartridge including two reels in a cartridge main body are widely used. In a case where the single reel type magnetic tape cartridge is mounted in the magnetic recording and reproducing device in order to record and/or reproduce data on the magnetic tape, the magnetic tape is drawn from the magnetic tape cartridge and wound around the reel on the magnetic recording and reproducing device side. A magnetic head is disposed on a magnetic tape transportation path from the magnetic tape cartridge to a winding reel. Sending and winding of the magnetic tape are performed between a reel (supply reel) on the magnetic tape cartridge side and a reel (winding reel) on the magnetic recording and reproducing device side. In the meantime, the magnetic head comes into contact with and slides on the surface of the magnetic layer of the magnetic tape, and accordingly, the recording and/or reproduction of data is performed. With respect to this, in the twin reel type magnetic tape cartridge, both reels of the supply reel and the winding reel are provided in the magnetic tape cartridge. The magnetic tape cartridge may be any of single reel type magnetic tape cartridge and twin reel type magnetic tape cartridge. A well-known technology can be applied for other details of the magnetic tape cartridge.

Magnetic Recording and Reproducing Device

One aspect of the invention relates to a magnetic recording and reproducing device including the magnetic recording medium and a magnetic head.

In the invention and the specification, the "magnetic recording and reproducing device" means a device capable of performing at least one of the recording of data on the magnetic recording medium or the reproducing of data recorded on the magnetic recording medium. Such a device is generally called a drive. The magnetic recording and reproducing device can be a sliding type magnetic recording and reproducing device. The sliding type magnetic recording and reproducing device is a device in which the surface of the magnetic layer and the magnetic head are in contact with each other and slide, in a case of performing recording of data on the magnetic recording medium and/or reproducing of the recorded data.

The magnetic head included in the magnetic recording and reproducing device can be a recording head capable of performing the recording of data on the magnetic recording medium, and can also be a reproducing head capable of performing the reproducing of data recorded on the magnetic recording medium. In addition, in the embodiment, the magnetic recording and reproducing device can include both of a recording head and a reproducing head as separate magnetic heads. In another embodiment, the magnetic head included in the magnetic recording and reproducing device can also have a configuration of comprising both of an element for recording data (recording element) and an element for reproducing data (reproducing element) in one magnetic head. Hereinafter, the element for recording data and the element for reproducing are collectively referred to as "elements for data". As the reproducing head, a magnetic head (MR head) including a magnetoresistive (MR) element capable of reading data recorded on the magnetic tape with excellent sensitivity as the reproducing element is preferable. As the MR head, various well-known MR heads such as an Anisotropic Magnetoresistive (AMR) head, a Giant Magnetoresistive (GMR) head, or a Tunnel Magnetoresistive (TMR) head can be used. In addition, the magnetic head which performs the recording of data and/or the reproducing of data may include a servo signal reading element. Alternatively, as a head other than the magnetic head which performs the recording of data and/or the reproducing of data, a magnetic head (servo head) including a servo signal reading element may be included in the magnetic recording and reproducing device. For example, the magnetic head which performs the recording of data and/or reproducing of the recorded data (hereinafter, also referred to as a "recording and reproducing head") can include two servo signal reading elements, and each of the two servo signal reading elements can read two adjacent servo bands at the same time. One or a plurality of elements for data can be disposed between the two servo signal reading elements.

In the magnetic recording and reproducing device, the recording of data on the magnetic recording medium and/or the reproducing of data recorded on the magnetic recording medium can be performed by bringing the surface of the magnetic layer of the magnetic recording medium into contact with the magnetic head and sliding. The magnetic recording and reproducing device may include the magnetic recording medium according to the embodiment of the invention, and well-known technologies can be applied for the other configurations.

For example, in a case of recording data on the magnetic recording medium in which the servo pattern is formed and/or reproducing the recorded data, first, the tracking is performed by using the servo signal obtained by reading the servo pattern. That is, as the servo signal reading element follows a predetermined servo track, the element for data is controlled to pass on the target data track. The movement of the data track is performed by changing the servo track to be read by the servo signal reading element in the tape width direction.

In addition, the recording and reproducing head can also perform the recording and/or reproducing with respect to other data bands. In this case, the servo signal reading element is moved to a predetermined servo band by using the UDIM information described above, and the tracking with respect to the servo band may be started.

EXAMPLES

Hereinafter, the invention will be described with reference to examples. However, the invention is not limited to embodiments shown in the examples. "Parts" and "%" in the following description mean "parts by mass" and "% by mass", unless otherwise noted. eq indicates equivalent and is a unit not convertible into SI unit. In addition, steps and evaluations described below are performed in an environment of an atmosphere temperature of 23° C.±1° C., unless otherwise noted.

Example 1

A list of each layer forming composition is shown below.
List of Magnetic Layer Forming Composition
Magnetic Liquid
Ferromagnetic powder (See Table 5) 100.0 parts
Oleic acid: 2.0 parts
Vinyl chloride copolymer (MR-104 manufactured by Kaneka Corporation): 10.0 parts
$SO_3Na$ group-containing polyurethane resin: 4.0 parts
(Weight-average molecular weight: 70,000, $SO_3Na$ group: 0.07 meq/g)
An amine-based polymer (DISPERBYK-102 manufactured by BYK Additives & Instruments): 6.0 parts
Methyl ethyl ketone: 150.0 parts
Cyclohexanone: 150.0 parts Abrasive Solution
  α-Alumina: 6.0 parts
  (Brunauer-Emmett-Teller (BET) specific surface area: 19 $m^2/g$, Mohs hardness: 9)
  $SO_3Na$ group-containing polyurethane resin: 0.6 parts
  (Weight-average molecular weight: 70,000, $SO_3Na$ group: 0.1 meq/g)
  2,3-dihydroxynaphthalene: 0.6 parts
  Cyclohexanone: 23.0 parts
Projection Formation Agent Liquid
  Projection formation agent (see Table 5): 1.3 parts
  Methyl ethyl ketone: 9.0 parts
  Cyclohexanone: 6.0 parts
Lubricant and Curing Agent Liquid
  Stearic acid: 3.0 parts
  Stearic acid amide: 0.3 parts
  Butyl stearate: 6.0 parts
  Methyl ethyl ketone: 110.0 parts
  Cyclohexanone: 110.0 parts
  Polyisocyanate (CORONATE (registered trademark) L manufactured by Tosoh Corporation): 3.0 parts
  List of Non-Magnetic Layer Forming Composition
  Non-magnetic inorganic powder
  α-iron oxide: 100.0 parts
  (Average particle size: 10 nm, BET specific surface area: 75 $m^2/g$)
  Carbon black: 25.0 parts
  (Average particle size: 20 nm)
  Sulfonate group-containing polyurethane resin: 18.0 parts
  (Weight-average molecular weight: 70,000, content of $SO_3Na$ group: 0.2 meq/g)
  Stearic acid: see Table 5
  Cyclohexanone: 300.0 parts
  Methyl ethyl ketone: 300.0 parts
  List of Back Coating Layer Forming Composition
  Non-magnetic inorganic powder
  α-iron oxide: 80.0 parts
  (Average particle size: 0.15 µm, BET specific surface area: 52 $m^2/g$)
  Carbon black: 20.0 parts
  (Average particle size: 20 nm)
  A vinyl chloride copolymer: 13.0 parts
  A sulfonic acid salt group-containing polyurethane resin: 6.0 parts
  Phenylphosphonic acid: 3.0 parts
  Cyclohexanone: 155.0 parts
  Methyl ethyl ketone: 155.0 parts
  Stearic acid: 3.0 parts
  Butyl stearate: 3.0 parts
  Polyisocyanate: 5.0 parts
  Cyclohexanone: 200.0 parts
  Preparation of Magnetic Layer Forming Composition The magnetic layer forming composition was prepared by the following method.

A magnetic liquid was prepared by dispersing (beads-dispersing) various components of the magnetic liquid with a batch type vertical sand mill for 24 hours. As dispersion beads, zirconia beads having a bead diameter of 0.5 mm were used.

Various components of the abrasive solution were mixed with each other and put in a transverse beads mill disperser together with zirconia beads having a bead diameter of 0.3 mm, so as to perform the adjustment so that a ratio of a bead volume to a total of the abrasive solution volume and the bead volume was 80%, the beads mill dispersion process was performed for 120 minutes, the liquid after the process was extracted, and an ultrasonic dispersion filtering process was performed by using a flow type ultrasonic dispersion filtering device. By doing so, the abrasive solution was prepared.

The projection formation agent liquid was prepared by filtering a dispersion liquid obtained by mixing the components of the above-mentioned projection formation agent liquid and then ultrasonically treating (dispersing) for 60 minutes with an ultrasonic output of 500 watts per 200 cc by a horn-type ultrasonic dispersing device with a filter having a hole diameter of 0.5 µm.

The magnetic liquid, the abrasive solution, the projection formation agent liquid, and the remaining components (lubricant and curing agent liquid) were introduced in a dissolver stirrer, and stirred at a circumferential speed of 10 m/sec for 30 minutes. Then, a process at a flow rate of 7.5 kg/min was performed for 3 passes with a flow type ultrasonic disperser, and then, the mixture was filtered with a filter having a hole diameter of 1 µm, to prepare a magnetic layer forming composition.

Preparation of Non-Magnetic Layer Forming Composition

A non-magnetic layer forming composition was prepared by dispersing various components of the non-magnetic layer forming composition described above with a batch type vertical sand mill by using zirconia beads having a bead diameter of 0.1 mm for 24 hours, and then performing filtering with a filter having a hole diameter of 0.5 µm.

Preparation of Back Coating Layer Forming Composition

Components except a lubricant (stearic acid and butyl stearate), polyisocyanate, and 200.0 parts of cyclohexanone among various components of the back coating layer forming composition were kneaded and diluted by an open kneader, and subjected to a dispersion process of 12 passes, with a transverse beads mill disperser and zirconia beads having a bead diameter of 1 mm, by setting a bead filling percentage as 80 volume %, a circumferential speed of rotor distal end as 10 m/sec, and a retention time for 1 pass as 2 minutes. After that, the remaining components were added and stirred with a dissolver, the obtained dispersion liquid was filtered with a filter having a hole diameter of 1 µm and a back coating layer forming composition was prepared.

Manufacturing of Magnetic Tape

A magnetic tape was manufactured as shown in FIG. 1. The details are as follows.

A support made of polyethylene naphthalate having a thickness of 5.0 µm was sent from the sending part, and the non-magnetic layer forming composition was applied to one surface thereof so that the thickness after the drying is 0.1 µm in the first coating part to form a coating layer. The cooling step was performed by passing the formed coating layer through the cooling zone in which the atmosphere temperature was adjusted to 0° C. for the retention time shown in Table 5 while the coating layer was wet, and then the heating and drying step was performed by passing the coating layer through the first heat treatment zone at the atmosphere temperature of 100° C., to form a non-magnetic layer.

Then, the magnetic layer forming composition prepared as described above was applied onto the non-magnetic layer so that the thickness after the drying is 0.1 µm in the second coating part, and a coating layer was formed. A homeotropic alignment process was performed in the alignment zone by applying a magnetic field having a magnetic field strength of 0.3 T to the surface of the coating layer of the magnetic layer forming composition in a vertical direction while the coating layer was wet (not dried), and the coating layer was dried in the second heat treatment zone (atmosphere temperature of 100° C.).

After that, in the third coating part, the back coating layer forming composition prepared as described above was applied to the surface of the non-magnetic support made of polyethylene naphthalate on a side opposite to the surface where the non-magnetic layer and the magnetic layer are formed, so that the thickness after the drying becomes 0.5 μm, to form a coating layer, and the formed coating layer was dried in a third heat treatment zone (atmosphere temperature of 100° C.).

Then, a calender process (surface smoothing treatment) was performed by using a calender roll configured of only a metal roll, at a speed of 80 m/min, linear pressure of 294 kN/m (300 kg/cm), and a calender temperature (surface temperature of a calender roll) of 90° C.

Then, the heat treatment was performed in the environment of the atmosphere temperature of 70° C. for 36 hours. After the heat treatment, the slitting was performed to have a width of ½ inches (0.0127 meters) to manufacture a magnetic tape.

In a state where the magnetic layer of the manufactured magnetic tape was demagnetized, servo patterns having disposition and shapes according to the LTO Ultrium format were formed on the magnetic layer by using a servo write head mounted on a servo writer. Accordingly, a magnetic tape including data bands, servo bands, and guide bands in the disposition according to the LTO Ultrium format in the magnetic layer, and including servo patterns having the disposition and the shape according to the LTO Ultrium format on the servo band was obtained.

Examples 2 to 18 and Comparative Examples 1 to 23

A magnetic tape was obtained by the same method as in the Example 1, except that various conditions shown in Table 5 were changed as shown in Table 5.

In Table 5, in the comparative examples in which "not performed" is disclosed in a column of the cooling zone retention time, a magnetic tape was manufactured by a manufacturing step not including the cooling zone in the non-magnetic layer forming step.

Projection Formation Agent

A projection formation agent used for manufacturing magnetic tape of examples or comparative examples is as follows. A projection formation agent 1 and a projection formation agent 3 are particles having a low surface smoothness of a surface of particles. A particle shape of a projection formation agent 2 is a shape of a cocoon. A particle shape of a projection formation agent 4 is a so-called indeterminate shape. A particle shape of a projection formation agent 5 is a shape closer to a sphere.

Projection formation agent 1: ATLAS (composite particles of silica and polymer) manufactured by Cabot Corporation, average particle size: 100 nm Projection formation agent 2: TGC6020N (silica particles) manufactured by Cabot Corporation, average particle size: 140 nm Projection formation agent 3: Cataloid (water dispersed sol of silica particles; as a projection formation agent for preparing a projection formation agent liquid, a dried solid material obtained by removing the solvent by heating the water dispersed sol described above is used) manufactured by JGC c&c, average particle size: 120 nm Projection formation agent 4: ASAHI #50 (carbon black) manufactured by Asahi Carbon Co., Ltd., average particle size: 300 nm Projection formation agent 5: PL-10L (water dispersed sol of silica particles; as a projection formation agent for preparing a projection formation agent liquid, a dried solid material obtained by removing the solvent by heating the water dispersed sol described above is used) manufactured by FUSO CHEMICAL CO., LTD., average particle size: 130 nm Ferromagnetic Powder In Table 5, "BaFe" is a hexagonal barium ferrite powder having an average particle size (average plate diameter) of 21 nm. "SrFe1" and "SrFe2" respectively indicate hexagonal strontium ferrite powder, and "ε-iron oxide" indicates ε-iron oxide powder.

The activation volume and the anisotropy constant Ku of the various ferromagnetic powders are values obtained by the method described above regarding each ferromagnetic powder by using an oscillation sample type magnetic-flux meter (manufactured by Toei Industry Co., Ltd.).

The mass magnetization σs is a value measured using a oscillation sample type magnetic-flux meter (manufactured by Toei Industry Co., Ltd.) at a magnetic field strength of 15 kOe.

Method 1 for Producing Hexagonal Strontium Ferrite Powder

In Table 5, "SrFe1" is a hexagonal strontium ferrite powder produced by the following method.

1707 g of $SrCO_3$, 687 g of H3BO3, 1120 g of Fe2O3, 45 g of Al(OH)3, 24 g of BaCO3, 13 g of CaCO3, and 235 g of Nd2O3 were weighed and mixed in a mixer to obtain a raw material mixture.

The obtained raw material mixture was dissolved in a platinum crucible at a dissolving temperature of 1390° C., and a tap hole provided on the bottom of the platinum crucible was heated while stirring the dissolved liquid, and the dissolved liquid was tapped in a rod shape at approximately 6 g/sec. The tap liquid was rolled and cooled with a water cooling twin roller to prepare an amorphous body.

280 g of the prepared amorphous body was put into an electronic furnace, heated to 635° C. (crystallization temperature) at a rate of temperature rise of 3.5° C./min, and held at the same temperature for 5 hours, and hexagonal strontium ferrite particles were precipitated (crystallized).

Then, the crystallized material obtained as described above including the hexagonal strontium ferrite particles was coarse-pulverized with a mortar, 1000 g of zirconia beads having a particle diameter of 1 mm and 800 ml of an acetic acid aqueous solution having a concentration of 1% were added to a glass bottle, and a dispersion process was performed in a paint shaker for 3 hours. After that, the obtained dispersion liquid and the beads were dispersed and put in a stainless still beaker. The dispersion liquid was left at a liquid temperature of 100° C. for 3 hours, subjected to a dissolving process of a glass component, precipitated with a centrifugal separator, decantation was repeated for cleaning, and drying was performed in a heating furnace at a furnace inner temperature of 110° C. for 6 hours, to obtain hexagonal strontium ferrite powder.

Regarding the hexagonal strontium ferrite powder (in Table 5, "SrFe1") obtained as described above, an average particle size was 18 nm, an activation volume was 902 $nm^3$, an anisotropy constant Ku was 2.2×105 $J/m^3$, and a mass magnetization σs was 49 $A·m^2/kg$.

12 mg of a sample powder was collected from the hexagonal strontium ferrite powder obtained as described above, the element analysis of a filtrate obtained by the partial dissolving of this sample powder under the dissolving conditions described above was performed by the ICP analysis device, and a surface layer portion content of a neodymium atom was obtained.

Separately, 12 mg of a sample powder was collected from the hexagonal strontium ferrite powder obtained as described above, the element analysis of a filtrate obtained by the total dissolving of this sample powder under the dissolving conditions described above was performed by the ICP analysis device, and a bulk content of a neodymium atom was obtained.

The content (bulk content) of the neodymium atom in the hexagonal strontium ferrite powder obtained as described above with respect to 100 atom % of iron atom was 2.9 atom %. In addition, the surface layer portion content of the neodymium atom was 8.0 atom %. A ratio of the surface layer portion content and the bulk content, "surface layer portion content/bulk content" was 2.8 and it was confirmed that the neodymium atom is unevenly distributed on the surface layer of the particles.

A crystal structure of the hexagonal ferrite shown by the powder obtained as described above was confirmed by scanning CuKα ray under the condition of a voltage of 45 kV and intensity of 40 mA and measuring an X-ray diffraction pattern under the following conditions (X-ray diffraction analysis). The powder obtained as described above showed a crystal structure of magnetoplumbite type (M type) hexagonal ferrite. In addition, a crystal phase detected by the X-ray diffraction analysis was a magnetoplumbite type single phase.

PANalytical X'Pert Pro diffractometer, PIXcel detector
Soller slit of incident beam and diffraction beam: 0.017 radians
Fixed angle of dispersion slit: ¼ degrees
Mask: 10 mm
Scattering prevention slit: ¼ degrees
Measurement mode: continuous
Measurement time per 1 stage: 3 seconds
Measurement speed: 0.017 degrees per second
Measurement step: 0.05 degree Method 2 for Producing Hexagonal Strontium Ferrite Powder In Table 5, "SrFe2" is a hexagonal strontium ferrite powder produced by the following method.

1725 g of $SrCO_3$, 666 g of $H_3BO_3$, 1332 g of $Fe_2O_3$, 52 g of $Al(OH)_3$, 34 g of $CaCO_3$, and 141 g of $BaCO_3$ were weighed and mixed in a mixer to obtain a raw material mixture.

The obtained raw material mixture was dissolved in a platinum crucible at a dissolving temperature of 1380° C., and a tap hole provided on the bottom of the platinum crucible was heated while stirring the dissolved liquid, and the dissolved liquid was tapped in a rod shape at approximately 6 g/sec. The tap liquid was rolled and cooled with a water cooling twin roll to prepare an amorphous body.

280 g of the obtained amorphous body was put into an electronic furnace, heated to 645° C. (crystallization temperature), and held at the same temperature for 5 hours, and hexagonal strontium ferrite particles were precipitated (crystallized).

Then, the crystallized material obtained as described above including the hexagonal strontium ferrite particles was coarse-pulverized with a mortar, 1000 g of zirconia beads having a particle diameter of 1 mm and 800 ml of an acetic acid aqueous solution having a concentration of 1% were added to a glass bottle, and a dispersion process was performed in a paint shaker for 3 hours. After that, the obtained dispersion liquid and the beads were dispersed and put in a stainless still beaker. The dispersion liquid was left at a liquid temperature of 100° C. for 3 hours, subjected to a dissolving process of a glass component, precipitated with a centrifugal separator, decantation was repeated for cleaning, and drying was performed in a heating furnace at a furnace inner temperature of 110° C. for 6 hours, to obtain hexagonal strontium ferrite powder.

Regarding the hexagonal strontium ferrite powder (in Table 5, "SrFe2") obtained as described above, an average particle size was 19 nm, an activation volume was 1102 nm3, an anisotropy constant Ku was 2.0×105 J/m3, and a mass magnetization σs was 50 A·m2/kg.

Method for Producing ε-Iron Oxide Powder

In Table 5, "ε-iron oxide" is an ε-iron oxide powder produced by the following method.

4.0 g of ammonia aqueous solution having a concentration of 25% was added to a material obtained by dissolving 8.3 g of iron (III) nitrate nonahydrate, 1.3 g of gallium (III) nitrate octahydrate, 190 mg of cobalt (II) nitrate hexahydrate, 150 mg of titanium (IV) sulfate, and 1.5 g of polyvinyl pyrrolidone (PVP) in 90 g of pure water, while stirring by using a magnetic stirrer, in an atmosphere under the conditions of an atmosphere temperature of 25° C., and the mixture was stirred for 2 hours still under the temperature condition of the atmosphere temperature of 25° C. A citric acid aqueous solution obtained by dissolving 1 g of citric acid in 9 g of pure water was added to the obtained solution and stirred for 1 hour. The powder precipitated after the stirring was collected by centrifugal separation, washed with pure water, and dried in a heating furnace at a furnace inner temperature of 80° C.

800 g of pure water was added to the dried powder and the powder was dispersed in water again, to obtain a dispersion liquid. The obtained dispersion liquid was heated to a liquid temperature of 50° C., and 40 g of ammonia aqueous solution having a concentration of 25% was added dropwise while stirring. The stirring was performed for 1 hour while holding the temperature of 50° C., and 14 mL of tetraethoxysilane (TEOS) was added dropwise and stirred for 24 hours. 50 g of ammonium sulfate was added to the obtained reaction solution, the precipitated powder was collected by centrifugal separation, washed with pure water, and dried in a heating furnace at a furnace inner temperature of 80° C. for 24 hours, and a precursor of ferromagnetic powder was obtained.

The heating furnace at a furnace inner temperature of 1000° C. was filled with the obtained precursor of ferromagnetic powder in the atmosphere and subjected to heat treatment for 4 hours.

The thermal-treated precursor of ferromagnetic powder was put into sodium hydroxide (NaOH) aqueous solution having a concentration of 4 mol/L, the liquid temperature was held at 70° C., stirring was performed for 24 hours, and accordingly, a silicon acid compound which was an impurity was removed from the thermal-treated precursor of ferromagnetic powder.

After that, by the centrifugal separation process, ferromagnetic powder obtained by removing the silicon acid compound was collected and washed with pure water, and ferromagnetic powder was obtained.

The composition of the obtained ferromagnetic powder was confirmed by Inductively Coupled Plasma-Optical Emission Spectrometry (ICP-OES), and Ga, Co, and Ti substitution type ε-iron oxide ($\varepsilon\text{-Ga}_{0.28}Co_{0.05}Ti_{0.05}Fe_{1.62}O_3$) was obtained. In addition, the X-ray diffraction analysis was performed under the same conditions as disclosed regarding the method 1 for producing the hexagonal strontium ferrite powder described above, and it was confirmed that the obtained ferromagnetic powder has a crystal structure of a single phase which is an ε phase not including a crystal structure of an a phase and a y phase (ε-iron oxide type crystal structure) from the peak of the X-ray diffraction pattern.

Regarding the obtained (ε-iron oxide powder (in Table 5, "ε-iron oxide"), an average particle size was 12 nm, an activation volume was 746 nm3, an anisotropy constant Ku was $1.2 \times 10^5$ J/m3, and a mass magnetization as was 16 A·m2/kg.

Evaluation Method (1) C—H Derived C Concentration after Pressing

Each magnetic tape of the examples and the comparative examples was passed between two rolls (without heating the rolls) six times in total while running the magnetic tape in a longitudinal direction at a speed of 20 m/min in a state where a tension of 0.5 N/m was applied, by using a calender treatment device including a 7-step calender roll configured of only a metal roll in an environment of an atmosphere temperature of 20° C. to 25° C. and relative humidity of 40% to 60%, and accordingly, the pressing was performed by applying a surface pressure of 70 atm to the surface of each magnetic layer, during the passing between each roll.

The X-ray photoelectron spectroscopic analysis was performed regarding the surface of the magnetic layer of a measurement sample cut out from the magnetic tape after pressing (measurement region: 300 μm×700 μm) by the following method using an ESCA device, and a C—H derived C concentration was calculated from the analysis result.

Analysis and Calculation Method

All of the measurement (i) to (iii) described below were performed under the measurement conditions shown in Table 1.

TABLE 1

| Device | AXIS-ULTRA manufactured by Shimadzu Corporation |
|---|---|
| Excitation X-ray source | Monochromatic Al-Kα ray (output: 15 kV, 20 mA) |
| Analyzer mode | Spectrum |
| Lens mode | Hybrid (analysis area: 300 μm × 700 μm) |
| Neutralization electron gun for charge correction (Charge neutralizer) | ON (used) |
| Light electron extraction angle (take-off angle) | 10 deg. (angle formed by a detector and a sample surface) |

(i) Wide Scan Measurement

A wide scan measurement (measurement conditions: see Table 2) was performed regarding the surface of the magnetic layer of the magnetic tape with the ESCA device, and the types of the detected elements were researched (qualitative analysis).

TABLE 2

| Scan range | Pass energy | Energy resolution (Step) | Capturing time (Dwell) | Number of integration times (Sweeps) |
|---|---|---|---|---|
| 0 TO 1200 eV | 160 eV | 1 eV/step | 100 ms/step | 5 |

(ii) Narrow Scan Measurement

All elements detected in (i) described above were subjected to narrow scan measurement (measurement conditions: see Table 3). An atomic concentration (unit: atom %) of each element detected from a peak surface area of each element by using software for a data process attached to the device (Vision 2.2.6) was calculated. Here, the C concentration was also calculated.

TABLE 3

| Spectra [Note1] | Scan range | Pass energy | Energy resolution (Step) | Capturing time (Dwell) | Number of integration times (Sweeps)[Note2] |
|---|---|---|---|---|---|
| C1s | 276 TO 296 eV | 80 eV | 0.1 eV/step | 100 ms/step | 3 |
| Cl2p | 190 TO 212 eV | 80 eV | 0.1 eV/step | 100 ms/step | 5 |
| N1s | 390 TO 410 eV | 80 eV | 0.1 eV/step | 100 ms/step | 5 |
| O1s | 521 TO 541 eV | 80 eV | 0.1 eV/step | 100 ms/step | 3 |
| Fe2p | 700 TO 740 eV | 80 eV | 0.1 eV/step | 100 ms/step | 3 |
| Ba3d | 765 TO 815 eV | 80 eV | 0.1 eV/step | 100 ms/step | 3 |
| Al2p | 64 TO 84 eV | 80 eV | 0.1 eV/step | 100 ms/step | 5 |
| Y3d | 148 TO 168 eV | 80 eV | 0.1 eV/step | 100 ms/step | 3 |
| P2p | 120 TO 140 eV | 80 eV | 0.1 eV/step | 100 ms/step | 5 |
| Zr3d | 171 TO 191 eV | 80 eV | 0.1 eV/step | 100 ms/step | 5 |
| Bi4f | 151 TO 171 eV | 80 eV | 0.1 eV/step | 100 ms/step | 3 |
| Sn3d | 477 TO 502 eV | 80 eV | 0.1 eV/step | 100 ms/step | 5 |
| Si2p | 90 TO 110 eV | 80 eV | 0.1 eV/step | 100 ms/step | 5 |
| S2p | 153 TO 173 eV | 80 eV | 0.1 eV/step | 100 ms/step | 5 |

Note1)

Spectra shown in Table 3 (element type) are examples, and in a case where an element not shown in Table 3 is detected by the qualitative analysis of the section (i), the same narrow scan measurement is performed in a scan range including entirety of spectra of the elements detected.

Note2)

The spectra having excellent signal-to-noise ratio (S/N ratio) were measured in a case where the number of integration times is set as three times. However, even in a case where the number of integration times regarding the entirety of spectra is set as five times, the quantitative results are not affected.

The C1s spectra were acquired under the measurement conditions disclosed in Table 4. Regarding the acquired C1s spectra, after correcting a shift (physical shift) due to a sample electrification by using software for a data process attached to the device (Vision 2.2.6), a fitting process (peak resolution) of the C1s spectra was performed by using the software described above. In the peak resolution, the fitting in C1s spectra was performed by a nonlinear least-squares method using a Gauss-Lorentz complex function (Gaussian component: 70%, Lorentz component: 30%), and a percentage (peak surface area ratio) of the C—H peak occupying the C1s spectra was calculated. A C—H derived C concentration was calculated by multiplying the calculated C—H peak surface area ratio by the C concentration acquired in (ii) described above.

TABLE 4

| Spectra | Scan range | Pass energy | Energy resolution (Step) | Capturing time (Dwell) | Number of integration times (Sweeps) |
| --- | --- | --- | --- | --- | --- |
| C1s | 276 TO 296 eV | 10 eV | 0.1 eV/step | 200 ms/step | 20 |

An arithmetical mean of values obtained by performing the above-mentioned process at different positions of the surface of the magnetic layer of the measurement sample three times was set as a C—H derived C concentration.

(2) Evaluation of Running Stability after Pressing at Pressure of 70 Atm

Regarding each magnetic tape of the examples and the comparative examples, a position error signal (PES) was obtained by the following method after the pressing in the section (1).

A servo pattern was read with a verifying head on a servo writer used in the formation of the servo pattern. The verifying head is a magnetic head for reading for confirming quality of the servo pattern formed in the magnetic tape, and an element for reading is disposed on a position corresponding to the position (position of the magnetic tape in a width direction) of the servo pattern, in the same manner as the magnetic head of the well-known magnetic tape device (drive).

In the verifying head, a well-known PES arithmetic circuit which calculates head positioning accuracy of the servo system as the PES is connected from an electrical signal obtained by reading the servo pattern in the verifying head. The PES arithmetic circuit calculates, as necessary, displacement of the magnetic tape in a width direction from the input electrical signal (pulse signal), and a value obtained by applying a high pass filter (cut-off: 500 cycles/m) with respect to a temporal change information (signal) of this displacement was calculated as the PES. The PES can be an index of running stability and it is possible to evaluate that the running stability is excellent, in a case where the PES calculated described above is equal to or smaller than 18 nm.

The result described above is shown in Table 5 (Tables 5-1 to 5-7).

TABLE 5-1

| | | | Example 1 | Example 2 | Example 3 | Example 4 | Example 5 | Example 6 |
| --- | --- | --- | --- | --- | --- | --- | --- | --- |
| Magnetic layer | Ferromagnetic powder | Type | BaFe | BaFe | BaFe | BaFe | BaFe | BaFe |
| | Projection formation agent | Type | Projection formation agent 1 | Projection formation agent 1 | Projection formation agent 1 | Projection formation agent 1 | Projection formation agent 1 | Projection formation agent 2 |
| Non-magnetic layer | Stearic acid | Content (part) | 2.0 | 2.0 | 2.0 | 2.0 | 6.0 | 2.0 |
| Manufacturing condition | Cooling zone retention time | | 1 second | 5 seconds | 50 seconds | 180 seconds | 1 second | 1 second |
| | C—H Derived C concentration after pressing | | 45 atom % | 55 atom% | 65 atom % | 70 atom % | 48 atom % | 45 atom % |
| | PES (nm) | | 16 | 13 | 10 | 8 | 16 | 16 |

TABLE 5-2

| | | | Example 7 | Example 8 | Example 9 | Example 10 | Example 11 | Example 12 |
|---|---|---|---|---|---|---|---|---|
| Magnetic layer | Ferromagnetic powder | Type | BaFe | BaFe | BaFe | BaFe | BaFe | BaFe |
| | Projection formation agent | Type | Projection formation agent 2 | Projection formation agent 2 | Projection formation agent 2 | Projection formation agent 2 | Projection formation agent 3 | Projection formation agent 3 |
| Non-magnetic layer | Stearic acid | Content (part) | 2.0 | 2.0 | 2.0 | 6.0 | 2.0 | 2.0 |
| Manufacturing condition | Cooling zone retention time | | 5 seconds | 50 seconds | 180 seconds | 1 second | 1 second | 5 seconds |
| | C—H Derived C concentration after pressing | | 55 atom % | 65 atom % | 70 atom % | 48 atom % | 45 atom % | 55 atom % |
| | PES (nm) | | 13 | 10 | 8 | 16 | 16 | 13 |

TABLE 5-3

| | | | Example 13 | Example 14 | Example 15 | Example 16 | Example 17 | Example 18 |
|---|---|---|---|---|---|---|---|---|
| Magnetic layer | Ferromagnetic powder | Type | BaFe | BaFe | BaFe | SrFe1 | SrFe2 | ε-iron oxide |
| | Projection formation agent | Type | Projection formation agent 3 | Projection formation agent 3 | Projection formation agent 3 | Projection formation agent 1 | Projection formation agent 1 | Projection formation agent 1 |
| Non-magnetic layer | Stearic acid | Content (part) | 2.0 | 2.0 | 6.0 | 2.0 | 2.0 | 2.0 |
| Manufacturing condition | Cooling zone retention time | | 50 seconds | 180 seconds | 1 second | 1 second | 1 second | 1 second |
| | C—H Derived C concentration after pressing | | 65 atom % | 70 atom % | 48 atom % | 45 atom % | 45 atom % | 45 atom % |
| | PES (nm) | | 10 | 8 | 16 | 16 | 16 | 16 |

TABLE 5-4

| | | | Comparative Example 1 | Comparative Example 2 | Comparative Example 3 | Comparative Example 4 | Comparative Example 5 | Comparative Example 6 |
|---|---|---|---|---|---|---|---|---|
| Magnetic layer | Ferromagnetic powder | Type | BaFe | BaFe | BaFe | BaFe | BaFe | BaFe |
| | Projection formation agent | Type | Projection formation agent 4 | Projection formation agent 5 | Projection formation agent 1 | Projection formation agent 2 | Projection formation agent 3 | Projection formation agent 4 |
| Non-magnetic layer | Stearic acid | Content (part) | 2.0 | 2.0 | 2.0 | 2.0 | 2.0 | 4.0 |
| Manufacturing condition | Cooling zone retention time | | Not performed | Not performed | Not performed | Not performed | Not performed | Not performed |
| | C—H Derived C concentration after pressing | | 35 atom % | 35 atom % | 35 atom % | 35 atom % | 35 atom % | 35 atom % |
| | PES (nm) | | 29 | 30 | 21 | 19 | 20 | 30 |

TABLE 5-5

| | | | Comparative Example 7 | Comparative Example 8 | Comparative Example 9 | Comparative Example 10 | Comparative Example 11 | Comparative Example 12 |
|---|---|---|---|---|---|---|---|---|
| Magnetic layer | Ferromagnetic powder | Type | BaFe | BaFe | BaFe | BaFe | BaFe | BaFe |
| | Projection formation agent | Type | Projection formation agent 4 | Projection formation agent 5 | Projection formation agent 5 | Projection formation agent 1 | Projection formation agent 1 | Projection formation agent 2 |
| Non-magnetic layer | Stearic acid | Content (part) | 6.0 | 4.0 | 6.0 | 4.0 | 6.0 | 4.0 |

TABLE 5-5-continued

| | | Comparative Example 7 | Comparative Example 8 | Comparative Example 9 | Comparative Example 10 | Comparative Example 11 | Comparative Example 12 |
|---|---|---|---|---|---|---|---|
| Manufacturing condition | Cooling zone retention time | Not performed | Not performed | Not performed | Not performed | Not performed | Not performed |
| C—H Derived C concentration after pressing | | 38 atom % | 35 atom % | 38 atom % | 35 atom % | 38 atom % | 35 atom % |
| PES (nm) | | 30 | 31 | 29 | 20 | 20 | 21 |

TABLE 5-6

| | | | Comparative Example 13 | Comparative Example 14 | Comparative Example 15 | Comparative Example 16 | Comparative Example 17 | Comparative Example 18 |
|---|---|---|---|---|---|---|---|---|
| Magnetic layer | Ferromagnetic powder | Type | BaFe | BaFe | BaFe | BaFe | BaFe | BaFe |
| | Projection formation agent | Type | Projection formation agent 2 | Projection formation agent 3 | Projection formation agent 3 | Projection formation agent 4 | Projection formation agent 4 | Projection formation agent 4 |
| Non-magnetic layer | Stearic acid | Content (part) | 6.0 | 4.0 | 6.0 | 2.0 | 2.0 | 2.0 |
| Manufacturing condition | Cooling zone retention time | | Not performed | Not performed | Not performed | 1 second | 5 seconds | 50 seconds |
| C—H Derived C concentration after pressing | | | 38 atom % | 35 atom % | 38 atom % | 40 atom % | 41 atom % | 42 atom % |
| PES (nm) | | | 20 | 20 | 19 | 30 | 30 | 31 |

TABLE 5-7

| | | | Comparative Example 19 | Comparative Example 20 | Comparative Example 21 | Comparative Example 22 | Comparative Example 23 |
|---|---|---|---|---|---|---|---|
| Magnetic layer | Ferromagnetic powder | Type | BaFe | BaFe | BaFe | BaFe | BaFe |
| | Projection formation agent | Type | Projection formation agent 4 | Projection formation agent 5 | Projection formation agent 5 | Projection formation agent 5 | Projection formation agent 5 |
| Non-magnetic layer | Stearic acid | Content (part) | 2.0 | 2.0 | 2.0 | 2.0 | 2.0 |
| Manufacturing condition | Cooling zone retention time | | 180 seconds | 1 second | 5 seconds | 50 seconds | 180 seconds |
| C—H Derived C concentration after pressing | | | 42 atom % | 40 atom % | 41 atom % | 42 atom % | 42 atom % |
| PES (nm) | | | 30 | 29 | 31 | 30 | 30 |

From the result shown in Table 5, it can be confirmed that, in all of the magnetic tapes of the examples, excellent running stability is exhibited after the pressing at a pressure of 70 atm, that is, in a state corresponding to the state after the long-term storage. According to this magnetic tape, even after the magnetic tape is accommodated in a state of being wound around a reel for a long period of time in the magnetic tape cartridge, after information with a low access frequency is recorded, the stable running can be performed in the magnetic recording and reproducing device, and the magnetic tape is suitable as a recording medium for archive.

One aspect of the invention is effective for data storage.

What is claimed is:

1. A magnetic recording medium comprising:
    a non-magnetic support; and
    a magnetic layer including a ferromagnetic powder,
    wherein one or more kinds of component selected from the group consisting of a fatty acid and a fatty acid amide are included in a portion of the magnetic layer side on the non-magnetic support, and
    a C—H derived C concentration calculated from a C—H peak surface area ratio in C1s spectra obtained by X-ray photoelectron spectroscopic analysis performed on a surface of the magnetic layer at a photoelectron take-off angle of 10 degrees, after pressing the magnetic layer at a pressure of 70 atm is 45 atom % or more.

2. The magnetic recording medium according to claim 1, wherein the C—H derived C concentration may be 45 atom % to 80 atom %.

3. The magnetic recording medium according to claim 1, wherein the magnetic layer includes inorganic oxide-based particles.

4. The magnetic recording medium according to claim 3, wherein the inorganic oxide-based particles are composite particles of an inorganic oxide and a polymer.

5. The magnetic recording medium according to claim 1, further comprising:
    a non-magnetic layer including a non-magnetic powder between the non-magnetic support and the magnetic layer.

6. The magnetic recording medium according to claim 1, further comprising:

a back coating layer including a non-magnetic powder on a surface of the non-magnetic support opposite to a surface provided with the magnetic layer.

7. The magnetic recording medium according to claim 1, wherein the magnetic recording medium is a magnetic tape.

8. A magnetic recording and reproducing device comprising:
   a magnetic recording medium; and
   a magnetic head,
   wherein the magnetic recording medium is a magnetic recording medium comprising:
   a non-magnetic support; and
   a magnetic layer including a ferromagnetic powder,
   wherein one or more kinds of component selected from the group consisting of a fatty acid and a fatty acid amide are included in a portion of the magnetic layer side on the non-magnetic support, and
   a C—H derived C concentration calculated from a C—H peak surface area ratio in C1s spectra obtained by X-ray photoelectron spectroscopic analysis performed on a surface of the magnetic layer at a photoelectron take-off angle of 10 degrees, after pressing the magnetic layer at a pressure of 70 atm is 45 atom % or more.

9. The magnetic recording and reproducing device according to claim 8, wherein the C—H derived C concentration may be 45 atom % to 80 atom %.

10. The magnetic recording and reproducing device according to claim 8, wherein the magnetic layer includes inorganic oxide-based particles.

11. The magnetic recording and reproducing device according to claim 10, wherein the inorganic oxide-based particles are composite particles of an inorganic oxide and a polymer.

12. The magnetic recording and reproducing device according to claim 8, wherein the magnetic recording medium further comprises a non-magnetic layer including a non-magnetic powder between the non-magnetic support and the magnetic layer.

13. The magnetic recording and reproducing device according to claim 8, wherein the magnetic recording medium further comprises a back coating layer including a non-magnetic powder on a surface of the non-magnetic support opposite to a surface provided with the magnetic layer.

14. The magnetic recording and reproducing device according to claim 8, wherein the magnetic recording medium is a magnetic tape.

* * * * *